(12) United States Patent
Sakakida

(10) Patent No.: US 7,578,519 B2
(45) Date of Patent: Aug. 25, 2009

(54) KNEE PROTECTION AIR BAG APPARATUS

(75) Inventor: Katsumi Sakakida, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 278 days.

(21) Appl. No.: 11/707,954

(22) Filed: Feb. 20, 2007

(65) Prior Publication Data
US 2007/0200322 A1 Aug. 30, 2007

(30) Foreign Application Priority Data
Feb. 28, 2006 (JP) .............................. 2006-053621

(51) Int. Cl.
*B60R 21/20* (2006.01)
(52) U.S. Cl. .................. 280/730.2; 280/728.3; 280/753
(58) Field of Classification Search .............. 280/728.3, 280/728.2, 730.1, 732, 753
See application file for complete search history.

(56) References Cited

U.S. PATENT DOCUMENTS

| 5,887,891 A * | 3/1999 | Taquchi et al. ............ 280/728.2 |
| 6,302,437 B1 * | 10/2001 | Marriott et al. ............. 280/732 |
| 6,902,186 B2 * | 6/2005 | Suzuki et al. ............ 280/730.1 |
| 7,055,851 B2 * | 6/2006 | Takimoto et al. ......... 280/730.1 |
| 7,350,801 B2 * | 4/2008 | Nakayama ............... 280/730.1 |
| 2004/0075253 A1 | 4/2004 | Morita |
| 2005/0006880 A1 * | 1/2005 | Nakayama ............... 280/730.1 |

FOREIGN PATENT DOCUMENTS

| JP | A-2003-205814 | 7/2003 |
| JP | A-2004-106560 | 4/2004 |

OTHER PUBLICATIONS

Office Action dated Apr. 25, 2008 in corresponding Chinese Patent Application No. 200710000489.2 (and English translation).

* cited by examiner

*Primary Examiner*—Ruth Ilan
(74) *Attorney, Agent, or Firm*—Posz Law Group, PLC

(57) ABSTRACT

In the knee protection air bag apparatus, the air bag cover is assembled to a case which stores therein an air bag and an inflator and also includes an opening formed in the vehicle backward direction portion thereof such that the air bag cover is movable with respect to the case in the vehicle back-and-forth direction, in the vehicle vertical direction and in the vehicle right and left direction and, at the same time, the air bag cover is mounted on its adjoining vehicle interior part (a lower panel). A projecting streak provided on the air bag cover regulates the movement of the air bag cover in the vehicle backward direction with respect to the case, whereby the expanding and developing power of the air bag can be properly transmitted to a breaking portion formed in the lid portion of the air bag cover.

12 Claims, 12 Drawing Sheets

KNEE PROTECTION AIR BAG APPARATUS

BACKGROUND OF THE INVENTION

1. Field of the Invention

The present invention relates to a knee protection air bag apparatus including an air bag which can be developed and expanded by charging expansion gas therein and can protect the knees of an occupant seated.

2. Related Art

Conventionally, as an air bag apparatus for protecting the knees of an occupant, there is known an air bag apparatus in which an air bag cover including a lid part and a general part with its periphery surrounded by the interior member of a vehicle is assembled to a case, which stores therein a folded air bag and an inflator and is mounted on and fixed to the body of the vehicle, such that the air bag cover is movable in three directions, that is, in the vertical direction, in the right and left direction and in the back-and-forth direction so as to be able to absorb an assembling error (for example, see Japanese Patent Publication JP 2003-205814A).

And, there is also known another air bag apparatus in which an air bag cover is structured such that the upper side portion of the air bag cover is secured to a case movably in the vertical direction, in the right and left direction and in the back-and-forth direction in such a manner as to be able to absorb an assembling error, while the lower side portion of the air bag cover is positioned such that the movement thereof in the back-and-forth direction is prevented, whereby the air bag cover can be prevented from wobbling in the back-and-forth direction (for example, see Japanese Patent Publication JP 2004-106560A).

In this type of air bag apparatus for protection of the kneels of an occupant, since the air bag cover including the lid part and the general part with its periphery surrounded by the interior member of the vehicle is movably assembled to the case which stores therein the folded air bag and the inflator and is mounted on and fixed to the body of the vehicle, when the air bag is expanded and developed, the air bag cover is pushed to the rear side of the vehicle by the expanding air bag and thus the moving amount of the air bag cover to the vehicle rear side increases, thereby weakening the breaking stress that the lid part of the air bag cover receives from the expanding air bag; and, depending on the assembled state of the air bag cover and case, there can be formed a clearance between them and thus the expanded air bag can be stuck out from the clearance, thereby raising a fear that the breaking stress of the air bag cannot be transmitted to the lid part of the air bag cover sufficiently.

SUMMARY OF THE INVENTION

It is an object of the present invention to provide a knee protection air bag apparatus which not only can absorb an assembling error when an air bag cover and a case are assembled together but also can transmit the breaking stress of an air bag provided due to the expanded and developed air bag to the lid portion of the air bag cover.

In solving the above problems, according to the invention according to the first aspect of the invention, there is provided a knee protection air bag apparatus disposed in front of an occupant seated in a vehicle, including:

a case fixed to a body of the vehicle for storing therein a folded air bag and an inflator for supplying expanding gas to the air bag, the case including an opening formed in a vehicle backward portion thereof;

an air bag cover including a lid portion covering the opening of the case and openable when the air bag develops and expands, a general portion disposed in a periphery of the lid portion and adjoining interior parts of the vehicle when the knee protection air bag apparatus is mounted in the vehicle, and an assembling mechanism for assembling the air bag cover to the case such that the air bag cover is movable in a vehicle back-and-forth direction; and a stopper portion formed at least one of the air bag cover and the case, wherein the stopper regulates a movement of the air bag cover in the vehicle backward direction in a state where the air bag cover is assembled to the case by the assembling mechanism.

In the knee protection air bag apparatus according to the invention, the case is mounted on and fixed to the body of the vehicle, the air bag cover is assembled to the case such that it is movable in the vehicle back-and-forth direction with respect to the case, and there is provided the stopper portion which regulates the moving amount of the air bag cover in the vehicle backward direction. When the case is mounted on and fixed to the body of the vehicle, there is a possibility that it can be mounted and fixed in a state where there is produced a mounting error with respect to a vehicle interior part adjoining the air bag cover, thereby causing a level difference or a clearance between the air bag cover and the vehicle interior part. However, by assembling the air bag cover to the case such that it is movable in the vehicle back-and-forth direction with respect to the case, such level difference and clearance can be absorbed to thereby improve the design of the appearance of the knee protection air bag apparatus. When the air bag develops and expands, the air bag presses the lid portion of the air bag cover from the vehicle forward side to the vehicle backward side due to its developing and expanding power to break and develop a breaking portion previously formed in the lid portion, with the result that the air bag can develop and expand toward the vehicle room. Since the air bag cover is assembled such that it is movable in the vehicle back-and-forth direction with respect to the case, there is a fear that pressing power due to the development and expansion of the air bag cannot be transmitted to the lid portion sufficiently. In view of this, according to the invention, because of provision of the stopper portion, the pressing power of the air bag is received by the stopper portion and thus can be transmitted to the air bag cover effectively, thereby being able to develop the lid portion quickly.

According to the second aspect of the invention, the stopper portion allows the air bag cover to move by a first movable amount in the vehicle backward direction with respect to the case in a state where the air bag cover is assembled to the case by the assembling mechanism such that the air bag cover is movable in the vehicle back-and-forth direction, and the first movable amount is set smaller than a second movable amount by which the air bag cover is allowed to move in the vehicle backward direction with respect to the case when the air bag cover is assembled to the case by the assembling mechanism such that the air bag cover is movable in the back-and-forth direction with respect to the case.

In the knee protection air bag apparatus according to the second aspect of the invention, while the stopper portion allows the air bag cover, which is pressed from the vehicle forward side to the vehicle backward side by the developing and expanding air bag, to move in the vehicle backward direction by a given amount (the first movable amount), the first movable amount is set smaller than the movable amount (the second movable amount) of the air bag cover up to which the air bag cover assembled so as to be movable in the vehicle back-and-forth direction is allowed to move in the vehicle backward direction with respect to the case by the assembling mechanism. Owing to this, before the air bag cover is moved with respect to the case up to the rear end of the second movable amount allowed by the assembling mechanism, the movement of the air bag cover is regulated by the first movable amount allowed by the stopper portion. This makes it possible to transmit more effectively the pressing power of the air bag which breaks and develops the breaking portion of the lid portion. Further, since the air bag cover and case are assembled together such that they are movable in the vehicle back-and-forth direction, when the air bag develops and expands, the air bag cover is pressed and moved in the vehicle backward direction. Therefore, there is a fear that there can be produced a clearance between the opening end of the opening on the vehicle backward side of the case through which the developing and expanding air bag and the air bag cover which has moved in the vehicle backward direction, and also that the developing and expanding air bag can develop and expand such that it sticks out of such clearance. Because the first movable amount is set smaller than the second movable amount, it is possible to effectively prevent the occurrence of the clearance.

According to the third aspect of the invention, the air bag cover includes the assembling mechanism for assembling the air bag cover to the case such that the air bag cover is movable in a vehicle vertical direction and in a vehicle right and left direction with respect to the case.

In the knee protection air bag apparatus according to the invention, since the air bag cover is assembled such that it is movable in addition to the vehicle back-and-forth direction, in the vehicle vertical direction and in the vehicle right and left direction, the level difference or clearance formed between the air bag cover and vehicle interior part due to the mounting error caused when the case is mounted and fixed to the body of the vehicle can be absorbed not only in the back-and-forth direction but also in the vertical direction and in the right and left direction, which can improve the design of the appearance of the knee protection air bag apparatus.

According to the fourth aspect of the invention, the air bag cover includes an assembly piece projected in a vehicle forward direction from the general portion and an engaging hole formed in the assembly piece which constitute the assembling mechanism;

the case includes a peripheral wall portion capable of storing the folded air bag and the inflator so as to cover outer. peripheries of the air bag and the inflator, and a vertical wall portion erected substantially in a vehicle vertical direction so as to extend outwardly from an opening end of the opening of the case;

a fit hole into which the assembly piece can be fitted is formed in the vertical wall portion;

a securing portion which can be secured to the engaging hole so as to be movable in the vehicle back-and-forth direction is formed in the peripheral wall portion;

a projecting streak which can be inserted into the fit hole and functions as the stopper portion is formed on the assembly piece on a vehicle-backward side of the engaging hole; and, the stopper portion includes a vertical portion having a rear portion thereof contacted with a vehicle-forward side surface of the vertical wall portion in a peripheral edge of the fit hole to thereby regulate the vehicle-backward movement of the air bag cover with respect to the case when the air bag cover moves in the vehicle backward direction with respect to the case.

In the knee protection air bag apparatus according to the invention, not only the air bag cover can be movably assembled to the case with a very simple structure but also, when the air bag develops and expands, the movement of the air bag cover in the vehicle backward direction with respect to the case can be regulated effectively.

According to the fifth aspect of the invention, the projecting streak is formed as a large-thickness portion provided by projecting a portion of the assembly piece.

In the knee protection air bag apparatus according to the invention, since the stopper portion is formed as a large-thickness portion provided by projecting a portion of the assembly piece, the movement of the air bag cover in the vehicle backward direction due to the developing and expanding air bag can be regulated more effectively, whereby the lid portion can be developed more quickly.

According to the sixth aspect of the invention, the projecting streak includes two or more ribs which are projected substantially perpendicularly from the assembly piece and arranged substantially parallel to each other in the back-and-forth direction.

In the knee protection air bag apparatus according to the invention, since there are provided the two or more ribs, there can be provided a similar effect to the invention according to claim 5.

According to the seventh aspect of the invention, the projecting streak includes a first inclined portion which is apart from a base end portion toward the vehicle backward direction with a vehicle-forward side portion as a base end portion to the assembly piece, and a vertical portion facing the peripheral wall portion on the rear side of the first inclined portion.

In the knee protection air bag apparatus according to the invention, the projecting streak, that is, the stopper portion includes a first inclined portion which, with its vehicle-forward side portion as its base end portion to the assembly piece, is apart from the base end portion toward the vehicle backward direction. Thanks to this, when assembling the air bag cover to the case, the stopper portion can be inserted smoothly into the fit hole formed in the vertical wall portion of the case. Also, the stopper portion includes a vertical portion facing the peripheral wall portion on the rear side of the first inclined portion. Thanks to this, while positively regulating the backward movement of the air bag cover with respect to the case caused by the pressing power due to the development and expansion of the air bag, the breaking portion can be broken positively to thereby be able to develop the lid portion.

According to the eight aspect of the invention, the vertical portion includes a second inclined portion which is inclined forwardly from the base end portion so as to be apart from the assembly piece toward with a vehicle-backward side portion existing backward of the first inclined portion as a base end portion.

Further, in this aspect of the invention, an inclination angle of the second inclined portion may be larger than an inclination angle of the first inclined portion.

In the knee protection air bag apparatus according to the invention, since the vertical portion includes the second inclined portion which is inclined forwardly from the base end portion so as to be apart from the assembly piece, even at a position near to the fit hole, the backward movement of the air bag cover with respect to the cover can be regulated, whereby the air bag cover can be pressed positively by the developing and expanding power of the air bag.

According to the ninth aspect of the invention, the vertical portion is formed substantially perpendicularly to the assembly piece on the backward side of the inclined portion of the first inclined portion.

In the knee protection air bag apparatus according to the invention, because the vertical portion includes a perpendicular portion which extends substantially perpendicularly to the assembly piece, the pressing power of the air bag cover to the case due to the expanding and developing power of the air bag cannot be weakened but can be applied properly.

According to the tenth aspect of the invention, the assembly piece is constituted by two or more assembly pieces, and the stopper portion is provided one on each of the two or more assembly pieces.

In the knee protection air bag apparatus according to the invention, because the assembly piece is constituted by two or more assembly pieces, and the stopper portion is provided one on each of the two or more assembly pieces, the vehicle backward movement of the air bag cover with respect to the case can be regulated more effectively.

According to the eleventh aspect of the invention, a portion of the general portion existing on the vehicle upward side of the lid portion of the air bag cover includes a mounting portion for mounting the air bag cover onto the vehicle interior part adjoining the air bag cover, and the assembly piece is disposed downward of the mounting portion and upward of the upper end of the lid portion in the vehicle vertical direction.

In the knee protection air bag apparatus according to the invention, the air bag cover, in its general portion of the lid portion existing on the upper side of the vehicle, includes the mounting portion for mounting the air bag cover to the adjoining vehicle interior part, and the assembly piece interposed between the lower portion of the mounting portion and the upper end of the lid portion for mounting the air bag cover to the case. This can improve the efficiency of the operation to mount the air bag cover onto the vehicle interior part.

According to the twelfth aspect of the invention, the air bag cover includes a side wall portion projected in the vehicle forward direction from the peripheral edge of the lid portion; the air bag cover is assembled to the case by the assembling mechanism such that the side wall portion of the air bag cover and the peripheral wall portion of the case are substantially parallel to each other and that the two wall portions have overlapping portions where they are overlapped on each other in the vehicle back-and-forth direction; and, the vehicle back-and-forth direction length of the overlapping portion is set larger than the first movable amount.

In the knee protection air bag apparatus according to the invention, the air bag cover includes a side wall portion projected in the vehicle forward direction from the peripheral edge of the lid portion, the air bag cover is assembled to the case such that the side wall portion of the air bag cover and the peripheral wall portion of the case are substantially parallel to each other, and these two wall portions have mutually overlapping portions in the vehicle back-and-forth direction which are set larger than the first movable amount. Thanks to this structure, even in a state where the air bag cover is moved in the vehicle backward direction due to the developing and expanding power of the air bag and the movement thereof is regulated by the stopper portion, that is, even in a state where the air bag cover is prevented from moving further in the vehicle backward direction, there is no possibility that a clearance can be produced between the side wall portion of the air bag cover and the peripheral wall portion of the case in the vehicle back-and-forth direction, whereby the developing and expanding air bag is allowed to develop and expand into the vehicle room positively.

DETAILED DESCRIPTION OF THE PREFERRED EMBODIMENTS

Now, description will be given below of embodiments of a knee protection air bag apparatus according to the invention.

First Embodiment

Figure 1:
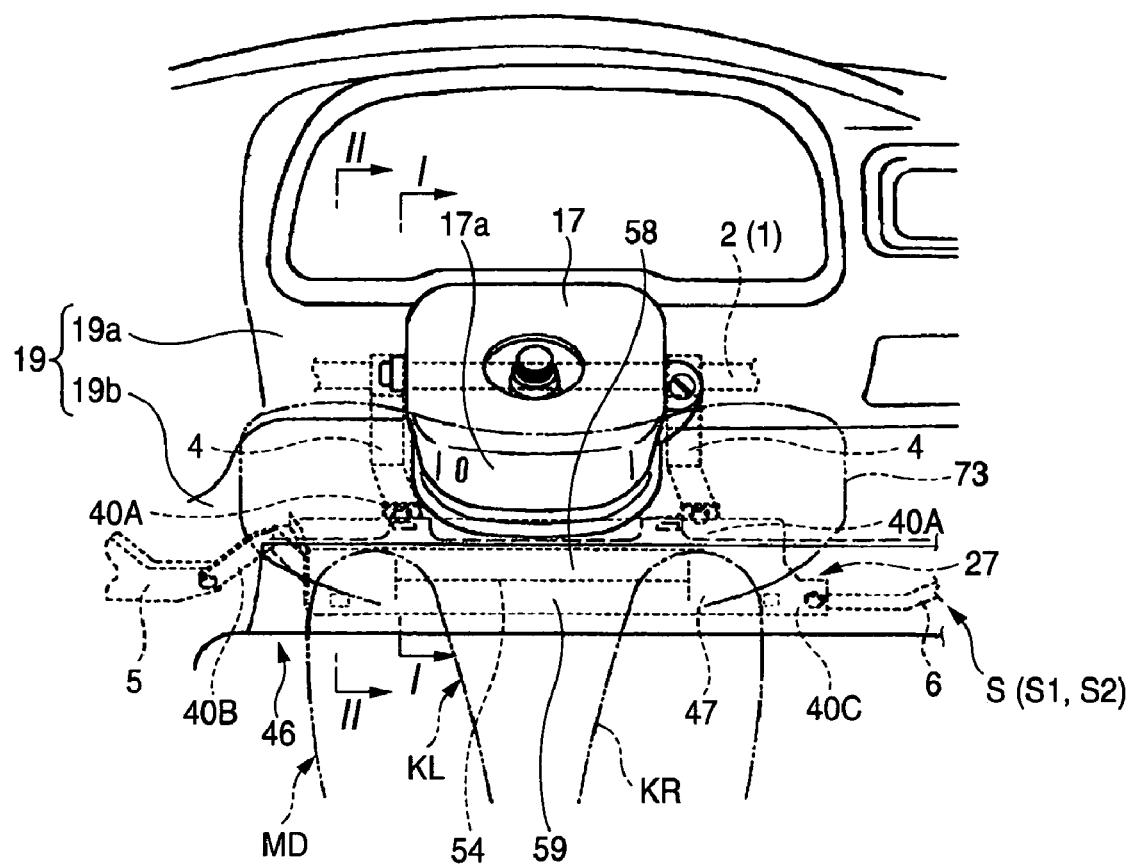
FIG. 1 is a schematic front view of a knee protection air bag apparatus according to first and second embodiments of the invention when it is viewed from the rear side of a vehicle, showing how to use such knee protection air bag apparatus.
Figure 2:
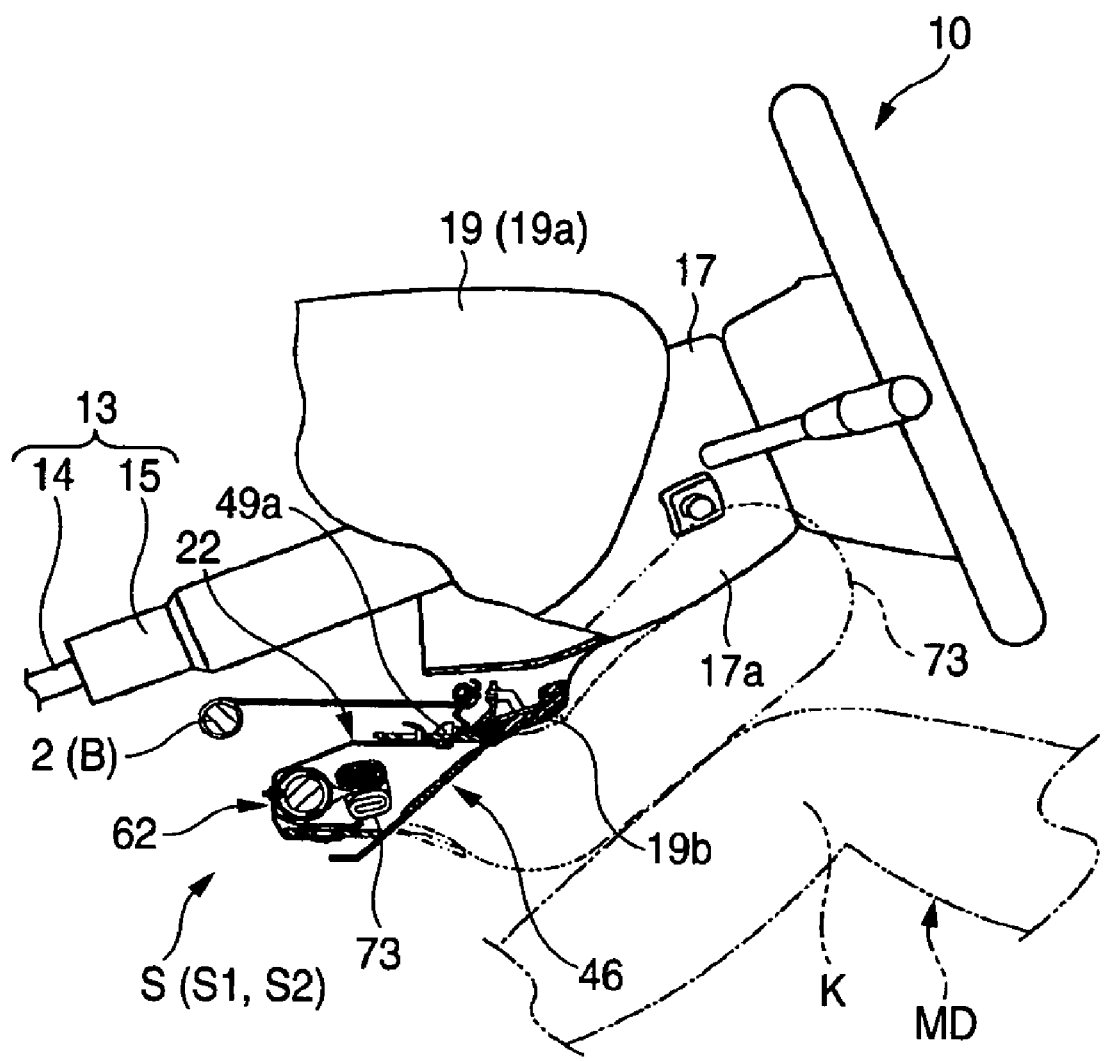
FIG. 2 is a vehicle back-and-forth direction schematic section view of a knee protection air bag apparatus according to the first embodiment of the invention taken along the portion I-I shown in FIG. 1, showing how to assemble such air bag apparatus.

A knee protection air bag apparatus S according to a first embodiment of the invention, as shown in FIGS. 1 and 2, is disposed below a steering column 13 which exists forward of an occupant MD in a vehicle so as to be able to protect the knees K (KL and KR) of the occupant MD.

By the way, referring here to direction-related terms, that is, "back and forth", "vertical" and "right and left" used in this specification, in a state where the knee protection air bag apparatus S is mounted in the vehicle, while the advancing direction of the vehicle is defined as the front side, the direction-related terms, "back-and-forth", "vertical" and "right and left" are defined based on such definition of the front side.

The steering column 13, as shown in FIG. 2, includes a main shaft 14 to be connected to the front side of a steering wheel 10 and a column tube 15 covering the periphery of the main shaft 14. Between the main shaft 14 and column tube 15, there are interposed a tilt mechanism (not shown) capable of adjusting the angle of the ring surface of the steering wheel 10, a telescopic mechanism (not shown) capable of moving the steering wheel 10 in the axial direction of the main shaft 14 and stopping the steering wheel 10, and the like.

A column cover 17, as shown in FIGS. 1 and 2, is made of synthetic resin having a substantially square tube shape or the like and is disposed along the axial direction of the steering column 13 such that it covers the steering column 13 existing in front of the steering wheel 10. That is, the vehicle front side of the column cover 17 is positioned low and the vehicle rear side thereof is positioned high, so that the column cover 17 is inclined upwardly as it goes toward the rear end portion thereof. And, the lower surface 17a of the portion of the column cover 17, which projects backwardly from an instrumental panel 19, has a substantially rectangular shape and, in the back-and-forth direction of the vehicle, is formed as a curved surface which rises upwardly as it goes toward its rear end.

The knee protection air bag apparatus S, as shown in FIGS. 1 to 4, includes a folded air bag 73, an inflator 62 for supplying expansion gas to the air bag 73, a case 22 for storing the folded air bag 73 and inflator 62 and having its vehicle backward side opened, and an air bag cover 46 for covering the vehicle backward side of the case 22. And, as regards the knee protection air bag apparatus S according to the first embodiment of the invention, the air bag 73, inflator 62 and air bag cover 46 are assembled to the case 22 to thereby provide an integrated assembly: that is, the thus integrally assembled knee protection air bag apparatus S is mounted onto the body B of the vehicle and is thereby mounted in the vehicle. In the first embodiment, the knee protection air bag apparatus S is mounted in the vehicle in an integrated assembly manner. However, when it is not necessary to take the assembling efficiency of the knee protection air bag apparatus S to the vehicle into consideration, the knee protection air bag apparatus S may also be mounted in the vehicle by assembling the respective composing parts of the knee protection air bag apparatus S sequentially to the vehicle.

The case 22, as shown in FIGS. 1 to 4, is made of sheet metal, is disposed downward of the steering column 13, and includes a storage part 23 and a knee panel 27 which are made separately. The storage part 23 and knee panel 27 are unified together by soldering and fixing together the fixing portion 32 (which will be discussed later) of the knee panel and the peripheral wall portion 24 (which will be discussed later) of the storage part 23. In the first embodiment, the unification of the storage part 23 and knee panel 27 is attained by the welding fixation. However, suppose the fixing strength is satisfied, the fixation is not limited to the welding fixation but there may also be used general connecting means such as bolts and nuts, rivets, and adhesives.

Figure 3:
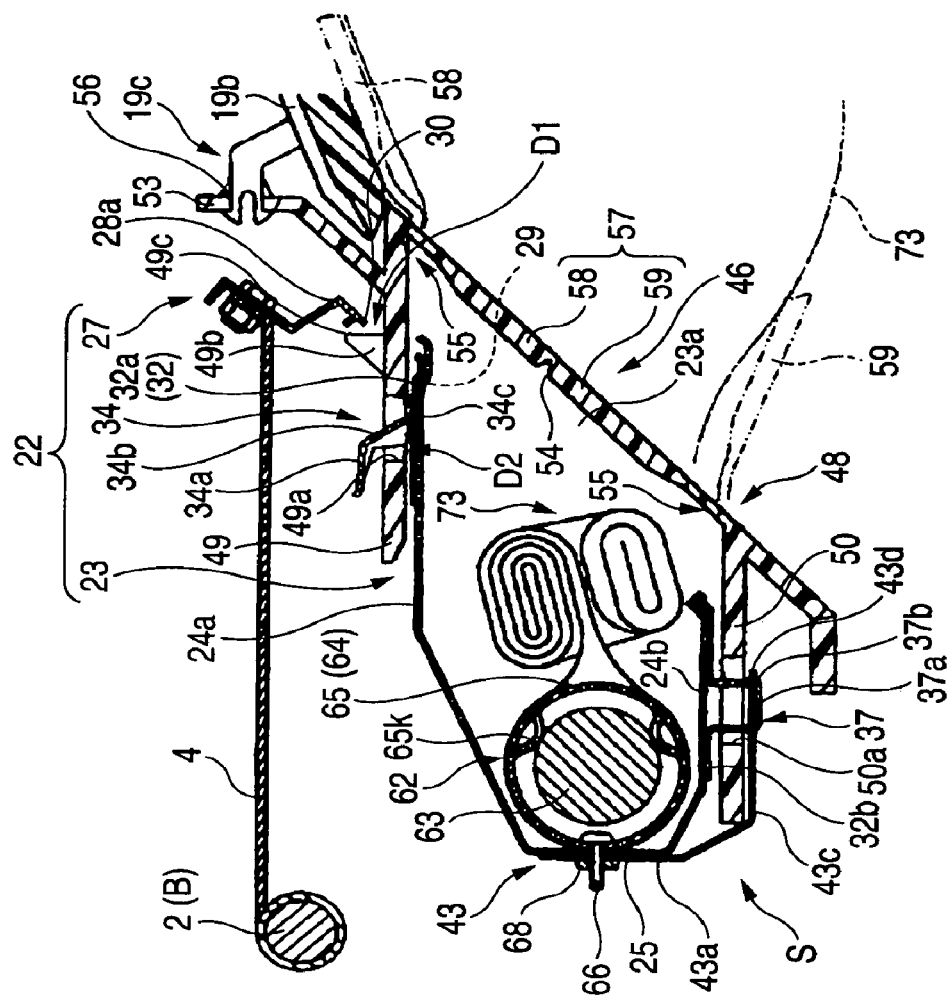
FIG. 3 is a vehicle back-and-forth direction enlarged schematic section view of a knee protection air bag apparatus according to the first embodiment of the invention taken along the portion I-I shown in FIG. 1, showing how to assemble such air bag apparatus.

The storage part 23 includes a substantially square cylindrical shaped peripheral wall portion 24 with its vehicle rear side formed as an opening 23a and a bottom wall portion 25 for closing the vehicle front side of the peripheral wall portion 24. Also, the storage part 23 is structured such that the width direction of the peripheral wall portion 24 extends substantially in the horizontal direction and the opening 23a of the peripheral wall portion 24, as shown in FIG. 3, is inclined with its lower portion situated on the vehicle forward side. In other words, according to the first embodiment, in the upper and lower peripheral wall portions 24a and 24b which are opposed to each other in the vertical direction, the whole length of the upper peripheral wall portion 24a in the back-and-forth direction is set larger than the whole length of the lower peripheral wall portion 24b in the back-and-forth direction, whereby the upper peripheral wall portion 24a of the peripheral wall portion 24 can be projected more backward than the lower peripheral wall portion 24b in the vehicle back-and-forth direction. Also, the right and left ends of the upper peripheral wall portions 24a are respectively connected to the right and left ends of the lower peripheral wall portions 24b by left and right peripheral wall portions 24c and 24d. In the right peripheral wall portion 24d, there is formed an insertion hole 24e into which the end portion of the main body 63 (which will be discussed later) of the inflator 62 can be inserted (see FIG. 4). Also, in the bottom wall portion 25, there are formed insertion holes 25a into which the bolts 66 (which will be discussed later) of the inflator 62 can be inserted.

The knee panel 27 is structured such that, when the air bag 73 develops and expands, it can support the vehicle forward side of the developed and expanded air bag 73. The knee panel 27 includes a main body portion 28, a mounting portion 40 for mounting and fixing the case 22 onto the body B of the vehicle and an upper securing portion 34 and a lower securing portion 37 which are used to assemble the air bag cover 46 to the case 22. When the working efficiency of the case 22 is not taken into consideration, the upper securing portion 34 and lower securing portion 37 may not be disposed in the knee panel 27 but may be disposed in the storage part 23.

The main body portion 28 is extended from the peripheral edge of the opening 23a of the storage part 23 and has a substantially rectangular shape. In the first embodiment, in the position of the main body portion 28 that corresponds to the opening 23a of the storage part 23, there is formed an insertion hole 29 not only which communicates with the opening 23a but also into which the opening 23a peripheral edge portion of the peripheral wall portion 24 of the storage part 23 can be inserted. Upwardly of the insertion hole 29, there is arranged a vertical wall portion 28a and, on the right and left sides of the insertion hole 29, there are arranged right and left wall portions 28b and 28c.

Figure 4:
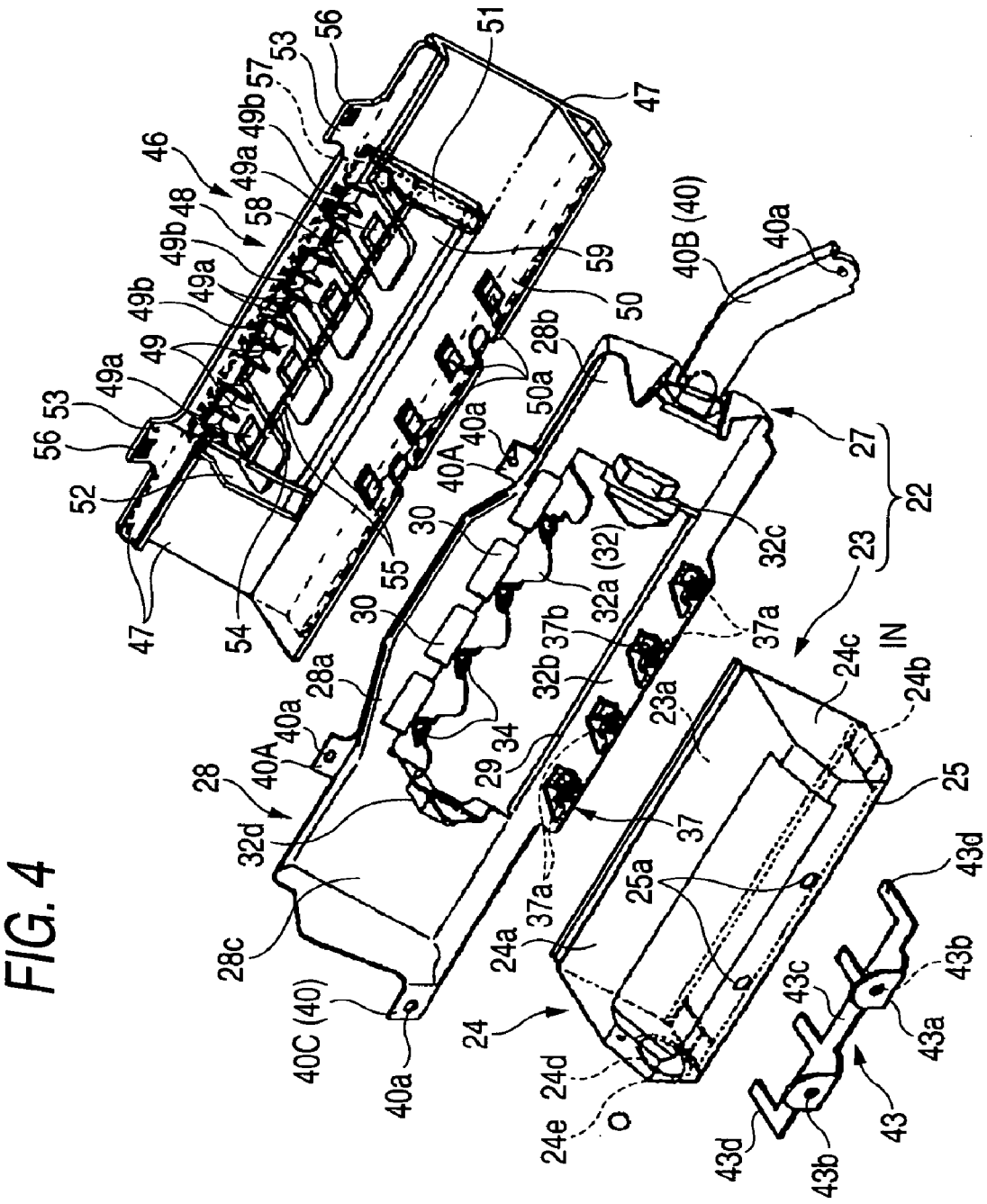
FIG. 4 is a vehicle back-and-forth direction enlarged schematic section view of an air bag cover and a case used in the knee protection air bag apparatus according to the first embodiment of the invention taken along the portion II-II shown in FIG. 1, showing how to assemble together such air bag cover and case.
Figure 5:
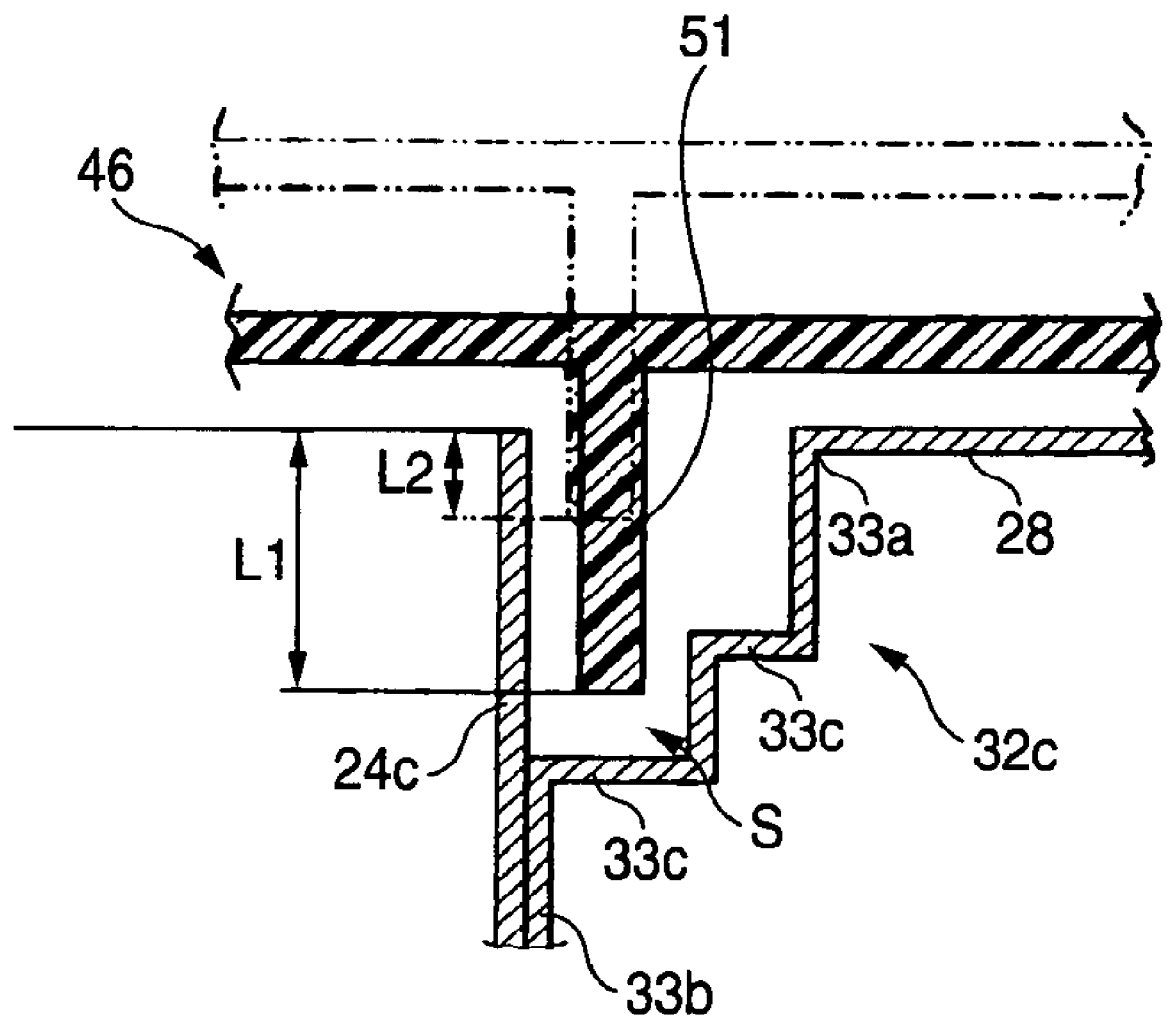
FIG. 5 is an enlarged section view of the main portions of the knee protection air bag apparatus according to the first embodiment of the invention in the assembled state thereof.

In the peripheral edge of the insertion hole 29, there is arranged a fixing portion 32 which projects in the vehicle forward direction from the main body portion 28 and can be fixed to the outer peripheral surface of the peripheral wall portion 24 existing near to the opening 23a. The fixing portion 32, according to the first embodiment, includes an upper fixing portion 32a, a lower fixing portion 32b; a left fixing portion 32c and a right fixing portion 32d which extend in the peripheral edge of the insertion hole 29 substantially over the whole periphery thereof. The upper and lower fixing portions 32a and 32b, as shown in FIG. 4, are formed substantially in a plate shape. Also, the left fixing portion 32c, as shown in FIG. 5, includes stepped portions 33c interposed between the main body portion 28 side base portion 33a of the left fixing portion 32c and the front side fixing end portion 33b thereof. The fixing end portion 33b is fixed to the left peripheral wall portion 24c, and, between the left fixing portion 32c and left peripheral wall portion 24c, there is formed a groove portion M having a dimension equivalent to the right and left direction dimension of the stepped portion 33c. Into the groove portion M, there can be inserted the front portion of the left side wall portion 51 (which will be discussed later) of the air bag cover 46. That is, in a state where the front portion of the left side wall portion 51 is inserted into the groove portion M, the left peripheral wall portion 24c and left side wall portion 51 have an overlapping portion L1 in the back-and-forth direction. By the way, in the first embodiment, the stepped portion 33c is formed as two stepped portions in order to secure the strength of the groove portion M; however, it may also be formed as one stage. The right fixing portion 32d is also structured symmetrically to the left fixing potion 32c;and thus, there is formed a groove portion M and the right side wall portion 52 (which will be discussed later) of the air bag cover 46.

The fixing portion 32 is welded to the peripheral wall portion 24 and is thereby fixed to and unified therewith, with the result that the fixing portion 32 constitutes part of the peripheral wall portion 24.

In the main body portion 28, specifically, in the vertical portion 28a existing upwardly of the insertion hole 29 into which the opening 23a can be inserted, there are formed two or more fit holes 30 (in the first embodiment, four fit holes spaced apart almost at regular intervals) into which the assembly pieces 49 (which will be discussed later) of the air bag cover 46 can be fitted, while each of the fit holes 30 penetrates through the vertical wall portion 28a and has a substantially rectangular shape.

The upper securing portion 34 and lower securing portion 37 are disposed such that, in the fixing portion 32 formed as part of the peripheral wall portion 24, they extend respectively from the upper fixing portion 32a and lower fixing portion 32b which correspond to the upper peripheral wall portion 24a and lower peripheral wall portion 24b of the peripheral wall portion 24 of the storage part 23. The pawl-shaped upper securing portion 34 is projected upwardly from the upper fixing portion 32a, whereas the substantially projection-shaped lower securing portion 37 is projected downwardly from the lower fixing portion 32b.

The upper securing portion 34, as shown in FIG. 3, is disposed in front of the position of the knee panel 27 that corresponds to the fit hole 30, and projects upwardly from the upper fixing portion 32a welded and fixed to the upper peripheral wall portion 24a to thereby form part of the upper peripheral wall portion 24a. Also, the upper securing portion 34 has a pawl-like shape having a substantially L-shaped section in which the leading end portion of the upper securing portion 34, namely, the removal preventive portion 34a thereof is bent toward the bottom wall portion 25 so as to be apart from the opening 23a of the storage part 23. Similarly to the fit holes 30, two or more upper securing portions 34 (in the first embodiment, four upper securing portions 34) are disposed along the right and left direction. The upper securing portion 34 is structured such that the leading end removal preventive portion 34a can be secured to the peripheral edge of a securing hole 49a which is formed in the assembly piece 49 of the air bag cover 46.

The lower securing portion 37, as shown in FIG. 3, projects downwardly from the lower fixing portion 32b forming part of the lower peripheral wall portion 24b and has a substantially U-shaped section. Specifically, there are disposed two or more (in the first embodiment, four) lower securing portions 37 along the right and left direction at positions which respectively correspond to the upper securing portions 34. Each lower securing portion 37 can be engaged into a securing hole portion 50a to be formed in an assembly plate 50 (which will be discussed later) disposed on the air bag cover 46: that is, the lower securing portion 37 can be assembled to the securing hole portion 50a by a hold member 43 (which will be discussed later) which is made separately from the knee panel 27. Also, the lower securing portion 37 includes a securing projection 37a which projects downwardly from the assembly plate 50 in a substantially U-shaped manner and, in the securing projection 37a, there is formed an insertion hole 37b which penetrates through the securing projection 37a in the back-and-forth direction and also into which the insertion portion 43d of the hold member 43 can be inserted.

The hold member 43, which is made of sheet metal, as shown in FIGS. 3 and 4, includes a vertical plate portion 43a and a transverse plate portion 43c which extends from the lower end of the vertical plate portion 43a in the right and left direction on the vehicle backward side. And, the hold member 43 has a substantially L-shaped section and extends from the front side of the storage part 23 to the lower side thereof. In the vertical plate portion 43a, there is formed a mounting hole 43b into which the bolt 66 of the inflator 62 can be inserted. In the transverse plate portion 43c, there are formed insertion portions 43d which face in the vehicle backward direction in a comb-like shape, while the insertion portions 43d can be inserted into the insertion holes 37b formed in the securing projection 37a of the lower securing portion 37. That is, the hold member 43 is structured such that, the insertion portions 43d can be respectively inserted into the insertion holes 37b and thus can be fixed in a bar manner between the securing projections 37a of the respective lower securing portions 37 to thereby prevent the securing projections 37a of the lower securing portions 37 from being removed from their associated securing hole portions 50a.

And, the hold member 43, as shown in FIG. 3, is fixed to the storage part 23 together with the inflator 62 using the bolts 66 and nuts 68 which are used to fix the inflator 62 to the storage part 23.

Mounting parts 40, in the first embodiment, as shown in FIG. 4, are respectively provided in the four corner portions of the peripheral edge of the main body part 28. In the respective mounting parts 40, there are formed mounting holes 40a which are used to bolt the mounting parts 40 onto the body B. On the body B onto which the mounting parts 40 are to be mounted, as shown in FIG. 1, there are provided brackets 4, 5 and 6. The brackets 4, 4 for mounting the upper side mounting parts 40A, 40A, as shown in FIG. 3, are connected to the instrument panel reinforcement 2 of an instrument panel 19 disposed on the body B. And, the brackets 5, 6 for lower side mounting parts 40B, 40C are connected to center braces (not shown), front body pillars (not shown), or the like disposed on the body B. By the way, in the first embodiment, a mounting part 40B is made separately from the main body portion 28 and by welding and fixing the end portion of the mounting part 40B, the mounting part 40B can be integrated with the main body portion 28 (see FIG. 4).

The air bag cover 46 is made of thermoplastic elastomer of a polyolefin system or the like and is structured so as to be able to cover the vehicle rearward side of the opening 23a. Also, the air bag cover 46 is formed separately from the instrument panel 19 which is used as an interior part of the vehicle and is constituted by an upper panel 19a and a lower panel 19b. And, as shown in FIG. 1, the air bag cover 46 is disposed downwardly of the portion of the lower panel 19b of the instrument panel 19 existing in the peripheral edge of the column cover 17 such that the air bag cover 46 adjoins the lower panel 19b (see FIG. 1). The air bag cover 46 includes a mounting portion 53 having a mounting hole 56; the lower panel 19b includes a clip 19c provided thereon; and, the air bag cover 46 and lower panel 19b can be fixed and positioned by inserting the clip 19c into the mounting hole 56 (see FIG. 3). In the first embodiment, the air bag cover 46 and lower panel 19b are disposed such that they can provide a point of change in the design of the vehicle rear side surface of the knee protection air bag apparatus (see FIG. 3). Further, the air bag cover 46 includes a lid arrange portion 48 to be disposed in the vicinity of the opening 23a of the case 22 and a general portion 47 which is disposed in the peripheral edge of the lid arrange portion 48.

The lid arrange portion 48 includes not only a lid portion 57 but also an assembly piece 49, an assembly plate 50, a left side wall portion 51, and a right side wall portion 52 which are respectively disposed in the portion of the lid arrange portion that exists in the vicinity of the peripheral edge of the lid portion 57 (see FIG. 4).

The lid portion 57 is formed slightly larger than the opening 23a of the case 22 in a substantially rectangular shape to cover the opening 23a; and, in the first embodiment, the lid portion 57 is composed to two lid portions, that is, an upper lid portion 58 which can be opened upwardly, and a lower lid portion 59 which can be opened downwardly. That is, the lid portion 57 is structured as follows: in the upper and lower end portions of the lid portion 57, there are disposed hinge portions 55, 55 which respectively function as the centers of rotation of the upper and lower lid portions 58, 59 when these lid portions are opened; and, in the peripheries of the upper and lower lid portions 58, 59, namely, in the portions which form a substantially H-like shape when they are viewed from the vehicle rear side, there is formed a small-thickness breaking portion 54 (see FIG. 4).

The assembly piece 49, assembly plate 50, left side wall portion 51 and right side wall portion 52 are respectively disposed such that they adjoin the outer peripheral side of the peripheral wall portion 24 of the storage part 23 and project in the vehicle forward direction. And, the air bag cover 46 can be assembled to the case 22 by the assembly piece 49 disposed in the vicinity of the upper peripheral wall portion 24a and the assembly plate 50 disposed in the vicinity of the lower peripheral wall portion 24b. In the first embodiment, the assembly piece 49 and assembly plate 50 are respectively disposed on the outer peripheral sides of the upper fixing portion 32a and lower fixing portion 32b of the knee panel 27, and the left and right side wall portions 51, 52, specifically, the front portions thereof are respectively inserted into the groove portions M, M which are respectively constituted by the left and right peripheral wall portions 24c, 24d of the storage part 23 and the left and right fixing portions 32c, 32d of the knee panel 27 (see FIG. 5).

As regards the assembly piece 49, as shown in FIG. 4, in correspondence to the pawl-shaped upper securing portions 34, there are disposed two or more assembly pieces 49 (in the first embodiment, four assembly pieces 49 spaced apart almost at regular intervals) along the right an left direction; and, the assembly pieces 49 respectively include engaging holes 49a which are opened substantially in a rectangular shape and are used to secure the pawl-shaped upper securing portions 34 thereto. Also, the width dimensions in the right and left direction of the assembly pieces 49 are set for such dimensions that the assembly pieces 49 can be inserted into the fit holes 30 formed in the knee panel 27. And, the assembly plate 50 is formed substantially in a rectangular plate and includes two or more securing hole portions 50a (in the first embodiment, four securing hole portions 50a) which are used to secure the securing projections 37a of the knee panel 27 thereto.

Also, the assembly pieces 49 and assembly plate 50 as well as the engaging holes 49a and securing hole portions 50a, and the pawl shaped upper and lower securing portions 34, 37 are respectively formed such that, when the air bag cover 46 is assembled to the case 22, the air bag cover 46 is movable in the back-and-forth direction, preferably, it is movable in three directions, that is, in the back-and-forth direction, in the vertical direction and in the right and left direction.

Specifically, as regards the assembly piece 49, as shown in FIG. 3, the back-and-forth direction length of the engaging hole 49a thereof is set larger than the back-and-forth direction thickness of the portion of the pawl-shaped upper securing portion 34 that extends in the vertical direction. Also, preferably, the vertical-direction thickness thereof may be set smaller than the length of the portion of the pawl-shaped upper securing portion 34 of the case 22 that extends in the vertical direction, and the engaging hole 49a may be set larger than the right-and-left direction width of the pawl-shaped upper securing portion 34 of the case 22. That is, in a state where the removal preventive portion 34a is secured to the engaging hole 49a by the pawl-shaped upper securing portion 34, the assembly piece 49 can be assembled to the case such that it is movable in the back-and-forth direction, preferably, in the three directions, namely, in the back-and-forth direction, in the vertical direction and in the right and left direction. By the way, as shown in FIG. 3, the rising portion of the back side of the pawl-shaped upper securing portion 34 that extends in the vertical direction is formed as an inclined surface extending from the back side to the front side so that the pawl-shaped upper securing portion 34 can be inserted into the engaging hole 49a smoothly.

Further, the vertical-direction thickness of the assembly piece 49 is set smaller than the vertical-direction inside diameter of the fit hole 30 of the case 22, while the right-and-left direction width thereof is also set smaller than the right-and-left direction inside diameter of the fit hole 30. Differences between the vertical-direction and right-and-left direction inside diameters of the fit hole 30 and the vertical-direction thickness and the right-and-left direction widths of the assembly piece 49 are respectively set larger than an amount by which the air bag cover 46 is allowed to move with respect the case 22 in the back-and-forth direction, in the vertical direction and in the right and left direction.

Figure 6:
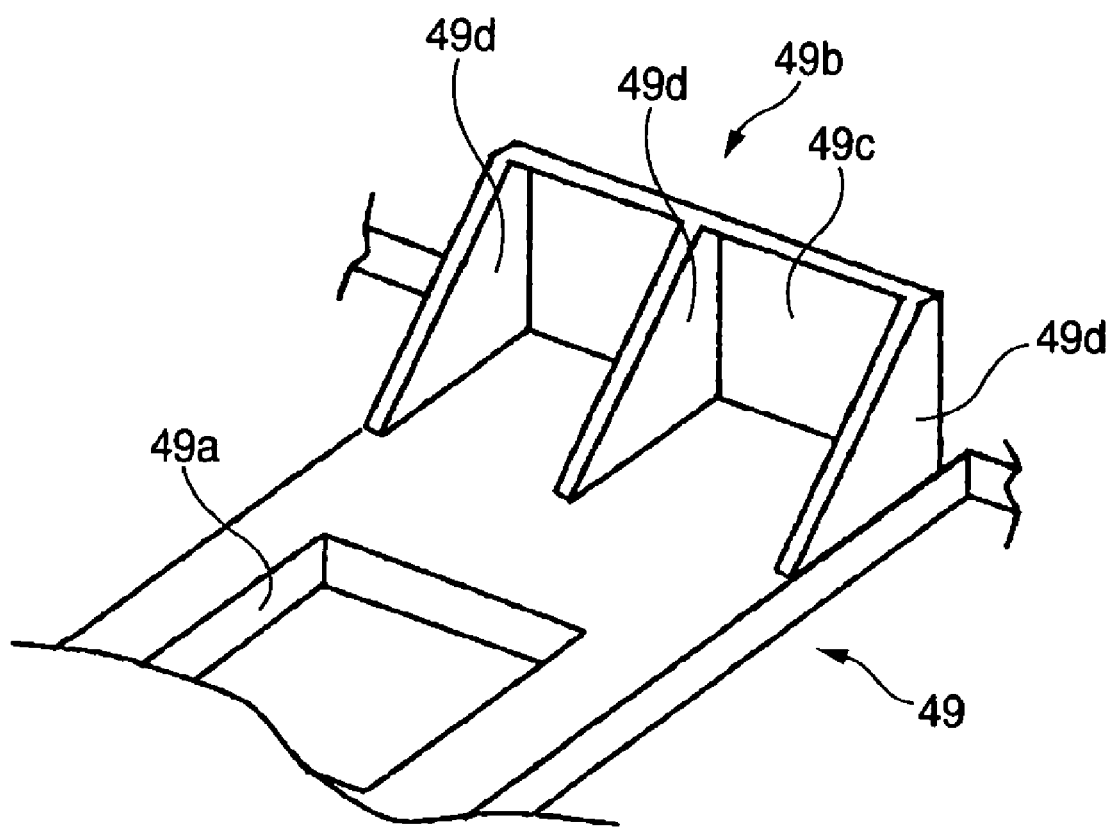
FIG. 6 is an enlarged side view of a stopper portion formed in the knee protection air bag apparatus according to the first embodiment of the invention.

Next, the assembly piece 49 includes a projecting streak 49b which projects upwardly on the rear side of the engaging hole 49a and functions as a stopper portion. The projecting streak 49b includes, on the rear side, a plate-shaped vertical portion 49c substantially perpendicular to the upper surface of the assembly piece 49, and three ribs 49d which are respectively extended forwardly of the vertical portion 49c. As regards the rib 49d, in order that it can provide a right angle shape when it is viewed from the side surface thereof, it is formed as an inclined portion 19e which extends from the rear side of the assembly piece 49 to the front side thereof. That is, the inclined portion 49e is formed such that, with the vehicle forward portion thereof as the base end portion thereof to the assembly piece 39, it is inclined so as to be apart from the base end portion in the vehicle backward direction. In the first embodiment, the three ribs 49d are disposed so as to be substantially parallel to each other in the vehicle back-and-forth direction; and, when it is viewed from above, the projecting streak 49 shows a substantially E-like shape with its front side opened. However, provided that the necessary strength can be secured, the number of ribs 49d is not limited to a specific number but the number of ribs 49d may be two or more (for example, for two ribs, they have a substantially U-like shape when it is viewed from above; and, for four or more ribs, they have a comb-like shape). (See FIG. 6).

Each of the two or more (in the first embodiment, four) assembly pieces 49 includes one projecting streak 49b. However, all of the assembly pieces 49 need not include the projecting pieces 49 but, provided that the strength can be secured, the number of assembly pieces which include projecting streaks may be adjusted.

As regards the assembly plate 50, as shown in FIG. 3, the back-and-forth direction length of the inside diameter of the securing hole portion 50a thereof is set larger than the back-and-forth direction length of the securing projection 37a that is the maximum length of the securing projection 37a. Also, preferably, not only the vertical direction thickness of the securing hole portion 50a may be set smaller than the vertical direction length of a clearance formed between the upper surface of the insertion portion 43d and the lower surface of the lower peripheral wall portion 24b in the securing projection 37 with the insertion portion 43d of the hold member 43 interposed between the assembly plate 50 and securing projection 37, but also the right-and-left direction width of the securing hole portion 50a may be set larger than the right-and-left direction width of the securing projection 37. That is, in a state where the hold member 43 is secured to the peripheral edge of the securing hole portion 50a, the assembly plate 50 is assembled to the case 22 such that it is movable in the back-and-forth direction, preferably, in the three directions, namely, in the back-and-forth direction, in the vertical direction, and in the right and left direction.

Further, as regards the projecting streak 49b, in a state where the air bag cover 46 is assembled to the case 22, as shown in FIG. 3, the projecting streak 49a is situated in front of the fit hole 30, the vertical portion 49c of the projecting streak 49b is situated so as to face the front side of the vertical wall portion 28a of the peripheral edge of the fit hole 30, and, between the vertical portion 49c and vertical wall portion 28a, there is formed a given clearance D1. The upper end of the vertical portion 49c is situated upwardly of the upper end of the inside diameter of the fit hole 30. That is, the projecting streak 49b is movable in the rearward direction with respect to the case 22 by an amount equivalent to the back-and-forth direction dimension of the clearance D1 (a first movable amount). This clearance D1 (the first movable amount), preferably, may be set smaller than a second movable amount D2 that is the backward movable amount of the air bag cover 46 which is assembled to the case 22 in a back-and-forth direction movable manner due to the engagement between the engaging hole, 49a and pawl-shaped upper securing portion 34 or due to the engagement between the securing hole portion 50a and securing projection 37a. Here, the second movable amount D2 is defined as a smaller one of the following two dimensions: that is, one is the back-and-forth direction dimension of a clearance formed between the rear side end portion of the inside diameter of the engaging hole 49a and the rear end of the pawl-shaped upper securing portion 34; and, the other is the back-and-forth direction dimension of a clearance formed between the rear side end portion of the inside diameter of the securing hole portion 50a and the rear end of the securing projection 37a. In the first embodiment, the back-and-forth dimension of the former clearance is used as the second movable amount D2.

The inflator 62, as shown in FIGS. 2 and 3, is structured as a cylinder type of inflator the axial direction of which is set along the right and left direction of the vehicle. The inflator 62 includes a substantially cylindrical main body 63 and a diffuser 64 made of sheet metal.

The main body 63 is of a type in which a given chemical agent is combusted to thereby discharge expanding gas, and the main body 63 includes two or more gas discharge ports formed in the outer peripheral surface of the end portion thereof which provides the vehicle interior side IN when the knee protection air bag apparatus is mounted in the vehicle. And, to the end face of the vehicle exterior side O of the main body 63 when the knee protection air bag apparatus is mounted in the vehicle, there is connected a connector (not shown) constituted by lead wires which are used to input operation signals. (See FIG. 3).

The diffuser 64 includes a substantially cylindrical-shaped hold barrel portion 65 made of sheet metal and capable of covering the main body 63, and two or more (in the first embodiment, two) bolts 66 which respectively project in the vehicle forward direction from the hold barrel portion 65. (See FIG. 3.).

In the hold barrel portion 65, there are disposed two or more hold portions 65k which are respectively used to hold the main body 63. Each of the hold portions 65k is cut away on its both sides along the axial direction of the hold barrel portion 65 and is plastically deformed so as to curve into the hold barrel portion 65. And, to fix the main body 63 to the hold barrel portion 65, the main body 63 may be inserted into the hold barrel portion 65 through an insertion hole formed in the end face of the hold barrel portion 65 and the respective hold portions 65k may be further pressed against the outer peripheral surface side of the main body 63. (See FIG. 3).

When an air bag operation circuit mounted in the vehicle detects the front collision of the vehicle, an operation signal is input to the inflator 62 as well as to an air bag apparatus (not shown) mounted in the steering wheel 10.

The air bag 73 is made of as single sheet of woven material constituted by flexible polyester threads, polyamide threads or similar threads. When the development and expansion thereof are completed, the air bag 73 has a substantially rectangular plate shape, as shown by two-dot chain lines in FIGS. 1 and 2, and has such a right-and-left direction width dimension as to be able to protect the two knees KL and KR of the occupant MD. Also, in the front end side portion of the air bag 73 when the development and expansion thereof are completed, there are formed not only holes into which the bolts 66 of the inflator 62 can be inserted but also a hole through which the main body 63 of the inflator 62 can be inserted into the air bag 73. And, the air bag 73 is mounted on the storage part 23 such that the peripheral edges of the holes thereof for insertion of the bolts 66 are held by and between the hold barrel portion 65 and the bottom wall portion 25 of the storage part 23.

Next, description will be given below of an operation to assemble the present knee protection air bag apparatus S. In this operation, previously, the fixing portion 32 of the knee panel 27 is welded and fixed to the peripheral wall portion 24 of the storage part 23 to connect together the storage part 23 and knee panel 27, whereby the case 22 is formed. Then, firstly, the inflator 62 is stored into the air bag 73 such that the bolts 66 project from the air bag 73, and then the air bag is folded. Next, the air bag is wrapped by a wrapping film (not shown) which not only can prevent the air bag 73 from bending and collapsing but also can be broken. At the then time, the end portions of the bolts 66 and main body 63 are projected from the wrapping film.

Next, such that the bolts 66 of the inflator 62 are respectively projected from the insertion holes 25a and the end portion of the main body 63 of the inflator 62 is projected from the insertion hole 24e, the inflator 62 is stored into the storage part 23 together with the folded air bag 73.

And, the air bag cover 46 is assembled to the case 22. At the then time, firstly, the assembly pieces 49 of the air bag cover 46 are respectively inserted into their associated insertion holes 30 formed in the knee panel 27, and the pawl-shaped securing portions 34 are respectively inserted into the engaging holes 49a formed in the assembly pieces 49 to thereby secure the leading end removal preventive portions 34a to the peripheral edges of the engaging holes 49a respectively. In this case, since the air bag cover 46 is made of thermoplastic elastomer such as a polyolefin system or the like, to assemble the air bag cover 46 to the case 22, in a state where the inclined portions 49d of the assembly pieces 49 are in contact with the upper ends of the inside diameters of the fit holes 30, the assembly pieces 49 can be inserted into their associated fit holes 30 while the assembly pieces 49 are being flexed wholly. Further, since the rear side portion of the pawl-shaped upper securing portion 34 is formed as the inclined portion 34b the front side of which is set high and which is inclined in the backward direction, the pawl-shaped upper securing portion 34 can be secured to the engaging hole 49a smoothly.

After then, the air bag cover 46 itself is moved while it is rotating about the portion thereof that is near to the fit hole 30, and the lower securing portions 37 are respectively inserted into their associated securing hole portions 50a formed in the assembly plate 50. And, such that the insertion portions 43d are respectively inserted into their associated insertion holes of the securing projections 37a projected from the assembly plate 50 and the bolts 66 are respectively inserted into their associated mounting holes 43b of the vertical plate portions 43a, the hold member 43 is disposed, and the nuts 68 are respectively threadedly engaged with their associated bolts 66 projected from the hold member 43. In this manner, the air bag cover 46 can be assembled to the case 22, thereby being able to produce the knee protection air bag apparatus S.

And, the respective mounting parts 40 of the knee panel 27 of the knee protection air bag apparatus S are mounted on and fixed to the body B using the brackets 4, 5 and 6 and, at the same time, the connector with the lead wires connected thereto is connected to the main body 63 of the inflator 62. After the instrument panel 19 is mounted, the lower panel 19b is mounted on the instrument panel 19 and, at the same time, the clips 19c of the lower panel 19b are inserted into and secured to the mounting holes 56 formed in the mounting portion 53 of the air bag cover 46, whereby the knee protection air bag apparatus S can be mounted in the vehicle (see FIGS. 1 and 2).

After the knee protection air bag apparatus S is mounted in the vehicle, when an operation signal is input through the lead wires to the main body 63 of the inflator 62, the expansion gas is discharged from the gas discharge port of the inflator 62 and is charged into the air bag 73 (see FIG. 3). And, the air bag 73 is thereby expanded to break the wrapping film, and the expanded air bag 73 also presses against the lid portion 57 of the air bag cover 46 to break the breaking portion 54, so that the upper and lower lid portions 58 and 59 are opened upward and downward respectively with the hinge portion 55 as the center of rotation thereof. Thus, as shown by the two-dot chain lines in FIGS. 1 and 2, while projecting upward greatly along the rear surface 17a of the column cover 17, the air bag 73 is developed and expanded. Also, since the air bag cover 46 and case 22 are assembled together firmly not only by the assembly pieces 49 and upper securing portion 34 but also by the assembly plate 50, lower securing portion 37 and hold member 43, there is no possibility that the air bag cover 46 and case 22 can be separated easily due to impact occurring when the air bag 73 is developed and expanded. By the way, the shapes of the lid portion 57 and breaking portion 54 of the air bag cover 46 are not limited to those described above but the lid portion and breaking portion may be formed as a single portion having a substantially U-like shape with the lower or upper side thereof as a hinge.

And, in the knee protection air bag apparatus S according to the first embodiment, the air bag cover 46 is assembled to the case 22 such that it is movable in the back-and-forth direction. This makes it possible to absorb an assembling error between the air cover 46 and lower panel 19b which are arranged so as to provide a point of change in the design of the vehicle rear side surface of the kneel protect air bag apparatus S, thereby being able to realize a design with no incongruity. Also, preferably, the air bag cover 46 may be assembled to the case 22 such that it is movable in three directions, that is, in the back-and-forth direction, in the vertical direction and in the right and left direction. In this case, in the operation to assemble together the air bag cover 46 and lower panel 19b, even when the axis of the mounting hole 56 of the air bag cover 46 is shifted from the axis of the clip 19c of the lower panel 19b disposed upwardly of the air bag cover 46 to thereby cause an assembly error, the air bag cover 46 is able to absorb such assembling error and thus the air bag cover 46 is movable with respect to the lower panel 19b such that it generates no incongruity with the lower panel 19b disposed upwardly thereof.

Here, the air bag cover 46, when the air bag 73 develops and expands, is pressed by the air bag 73 and is moved in the vehicle backward direction with respect to the case 22. In this operation, because the vertical portion 49c of the projecting streak 49b is contacted with the main body portion 28 in the peripheral edge of the fit hole 30 from the vehicle forward side, the air bag cover 46 can receive the pressure applied thereto from the air bag 73 when it is developed and expanded, whereby the developing and expanding power of the air bag 73 can be transmitted to the lid portion 57 effectively. By the way, in the first embodiment, owing to the fact that the pawl-shaped upper securing portion 34 of the case 22 is engaged with the engaging hole 49a of the assembly piece 49, it is considered that the air bag cover 46 is movable in the backward direction as well by a given amount (D2) (the second movable amount) with respect to the case 22. On the other hand, between the rear end of the vertical portion 49c of the projecting streak 49b and the vertical wall portion 28a of the peripheral edge of the fit hole 30 as well, there is formed a given clearance (D1), the air bag cover 46 is movable in the vehicle backward direction by an amount equivalent to this clearance (the first movable amount). However, because the clearance D1 is set smaller than the clearance D2, the developing and expanding power of the air bag 73 can be transmitted to the lid portion 57 more effectively. (See FIG. 3).

Also, at the position to which the air cover 46 has been pressed and moved in the backward direction by the clearance D1 owing to the development and expansion of the air bag 73, the air bag cover 46 may not able to receive the pressure of the air bag 73 sufficiently due to the deformation of the assembly piece 49 or due to the misalignment of the projecting streak 49b with the fit hole 30. However, even in this case, because the front end of the pawl-shaped upper securing portion 34 is contacted with the rear end of the inside diameter of the engaging hole 49a, at a position where the air bag cover 46 has moved backward by the clearance D2, the air bag cover 46 is prevented against further movement, whereby the air bag cover 46 is allowed to transmit the developing and expanding power of the air bag 73 to the lid portion 57 effectively.

Further, in a state where the air bag cover 46 and case 22 are assembled together, as shown in FIG. 5, the front portions of the right and left side wall portions 51, 52 of the air bag cover 46 are inserted in right and left groove portions M, M formed in the case 22. That is, the right and left side wall portions 51, 52 and right and left peripheral wall portions 24 c, 24d are overlapped on top of each other in the back-and-forth direction to thereby form overlapping portions L1.

When the air bag 73 develops and expands, the air bag cover 46 is pressed by the expanding and developing power of the air bag 73 and is thereby moved in the backward direction in which it is apart from the case 22. In response to this, the lid portion 57 of the air bag cover 46 is broken in the breaking portion 54, and the upper and lower lid portions 58 and 59 are respectively rotated about their associated hinge portions 55 and 55 and are developed respectively upward and downward to expand and develop the air bag 73 into the vehicle room, thereby being able to protect the knees K (KL, KR) of the occupant MD.

At the then time, when the air bag cover 46 is moved backward by an amount equivalent to a smaller one of the first and second movable amounts D1 and D2, the air bag cover 46 is prevented against its further backward movement. In the first embodiment, because D1 is set smaller than D2, when the air bag cover 46 is moved backward by a dimension amount equivalent to the first movable amount D1, the rear end of the vertical portion 49c of the projecting streak 49b is contacted with the vertical wall portion 28a of the peripheral edge of the fit hole 30, whereby the air bag cover 46 is prevented from moving backward with respect to the case 22. At the time, since the expanding and developing power of the air bag 73 can be received positively due to contact between the rear end of the vertical portion 49c of the projecting streak 49b and the vertical wall portion 28a of the peripheral edge of the fit hole 30, the pressure against the lid portion 57 cannot be weakened but can be transmitted to the breaking portion 54.

Also, when the air bag cover 46 is moved backward with respect to the case 22, as shown by two-dot chain lines in FIG. 5, the front portions of the right and left side wall portions 51, 52 respectively stored in the groove portions M, M are moved toward openings formed backwardly of the groove portions M, M. That is, although the front portions of the right and left side wall portions 51, 52 are moved backwardly of the groove portions M, M, in a state where, because the rear end of the vertical portion 49c of the projecting streak 49b is contacted with the vertical wall portion 28a of the peripheral edge of the fit hole 30, the air bag cover 46 is prevented from moving backward with respect to the case 22, the front portions of the right and left side wall portions 51, 52 are respectively held within the groove portions M, M and they are overlapped on the right and left peripheral wall portions 24c, 24d respectively, thereby forming an overlap portion L2 in the back-and-left direction.

As regards the air bag 73 which expands and develops, in the initial stage of the expansion and development thereof, the air bag 73 expands and develops along the peripheral wall portion 24 of the storage part 23 and also presses against the lid portion 57 of the air bag cover 46; and then, the air bag 73 breaks the breaking portion 54 and thus expands and develops toward the knees K of the occupant MD in the vehicle room. Even when the air bag cover 46 is moved backward with respect to the case 22, because the right and left side wall portions 51, 52 of the air bag cover 46 and the right and left peripheral wall portions 24c, 24d of the case 22 have the overlapping portions L2 in the back-and-forth direction, the developing and expanding air bag 73 is guided by the right and left side wall portions 51, 52 and right and left peripheral wall portions 24c, 24d, whereby the air bag 73 is able to positively develop and expand toward the knees K of the occupant MD seated in the vehicle room.

By the way, in the first embodiment, the relationship between the first and second movable amounts D1 and D2 are set such that D1<D2. However, when the relationship is set such that D1>D2, the second movable amount of the air bag cover 46 in the backward direction with respect to the case 22 is regulated by D2. That is, the contact of the front end of the vertically extending rise portion 34c on the rear side of the pawl-shaped upper securing portion 34 with the front end side of the inside diameter of the engaging hole 49a regulates the backward movement of the air bag cover 46 with respect to the case 22. Since the air bag cove 46 is made of thermoplastic elastomer such as a polyolefin system, it is easy to deform due to stress, heat or the like. Specifically, the air bag cover 46 can be deformed when the expanded and developed air bag 73 applies the pressure to the lid portion 57 of the air bag cover 46, so that the air bag cover 46 is movable further backwardly of the second movable amount D2. However, even in this case, since the vertical portion 49c of the projecting streak 49b is contacted with the main body portion 28 in the peripheral edge of the fit hole 30 from the vehicle forward side, the air bag cover 46 can receive the pressure applied thereto by the developed and expanded air bag 73 and thereby can transmit the developing and expanding power of the air bag 73 to the lid portion 57 effectively.

Second Embodiment

Next, description will be given below of a kneel protect air bag apparatus S1 according to a second embodiment of the invention with reference to FIGS. 1, 7 to 9. In the second embodiment, the same parts thereof as in the first embodiment are given the same designations and description will be given below of the parts thereof that are different from those used in the first embodiment.

The kneel protect air bag apparatus S1 according to the second embodiment, as shown in FIG. 1, similarly to the first embodiment, is disposed downwardly of the steering column 13 existing on the vehicle front side of the occupant MD in order to be able to protect the knees K (KL, KR) of the occupant MD.

In the second embodiment, at the same position of the assembly piece 49 as in the first embodiment, that is, on the rear side of the engaging hole 49a, there is provided a projecting streak 49f which projects upwardly and functions as a stopper portion. The projecting streak 49f is structured as a large-thickness portion which projects from a portion of the assembly piece 49 and has the same width as the right-and-left direction width of the assembly piece 49. (See FIG. 8).

Figure 7:
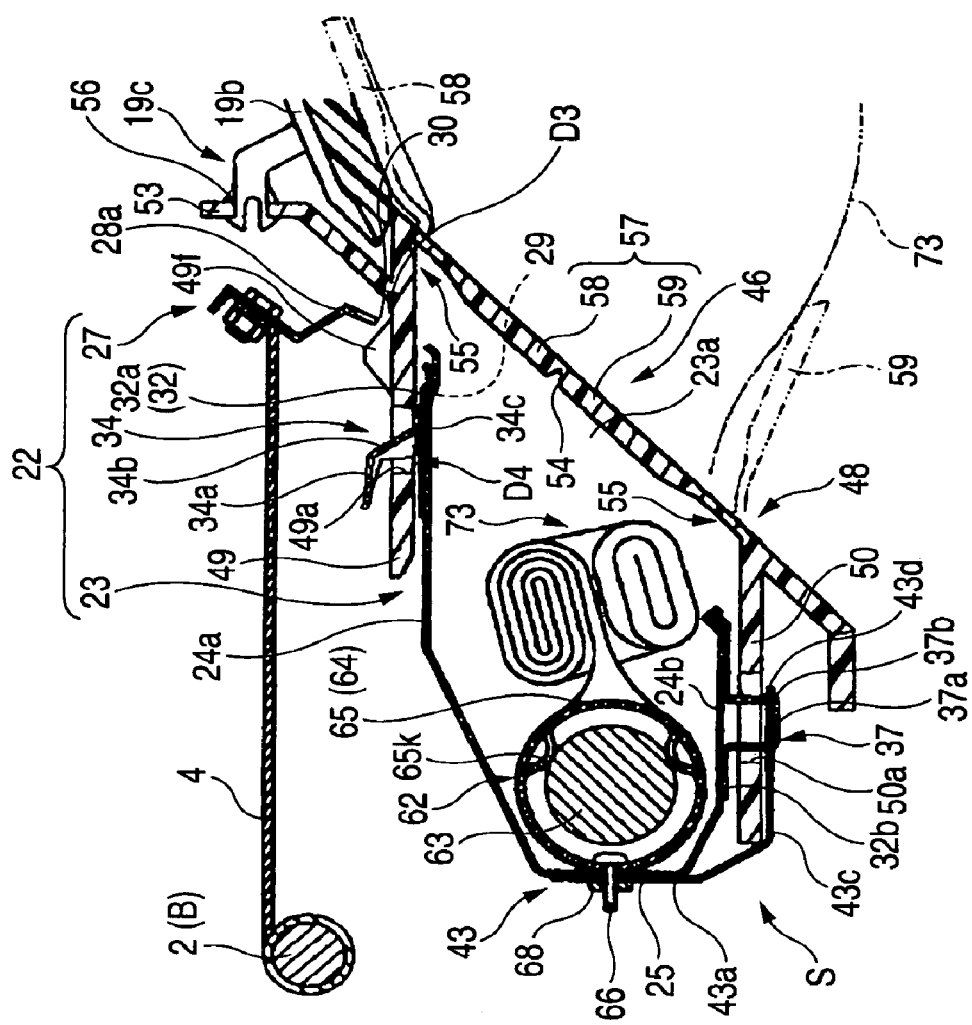
FIG. 7 is a vehicle back-and-forth direction schematic section view of a knee protection air bag apparatus according to the second embodiment of the invention taken along the portion I-I shown in FIG. 1, showing how to assemble such air bag apparatus.
Figure 8:
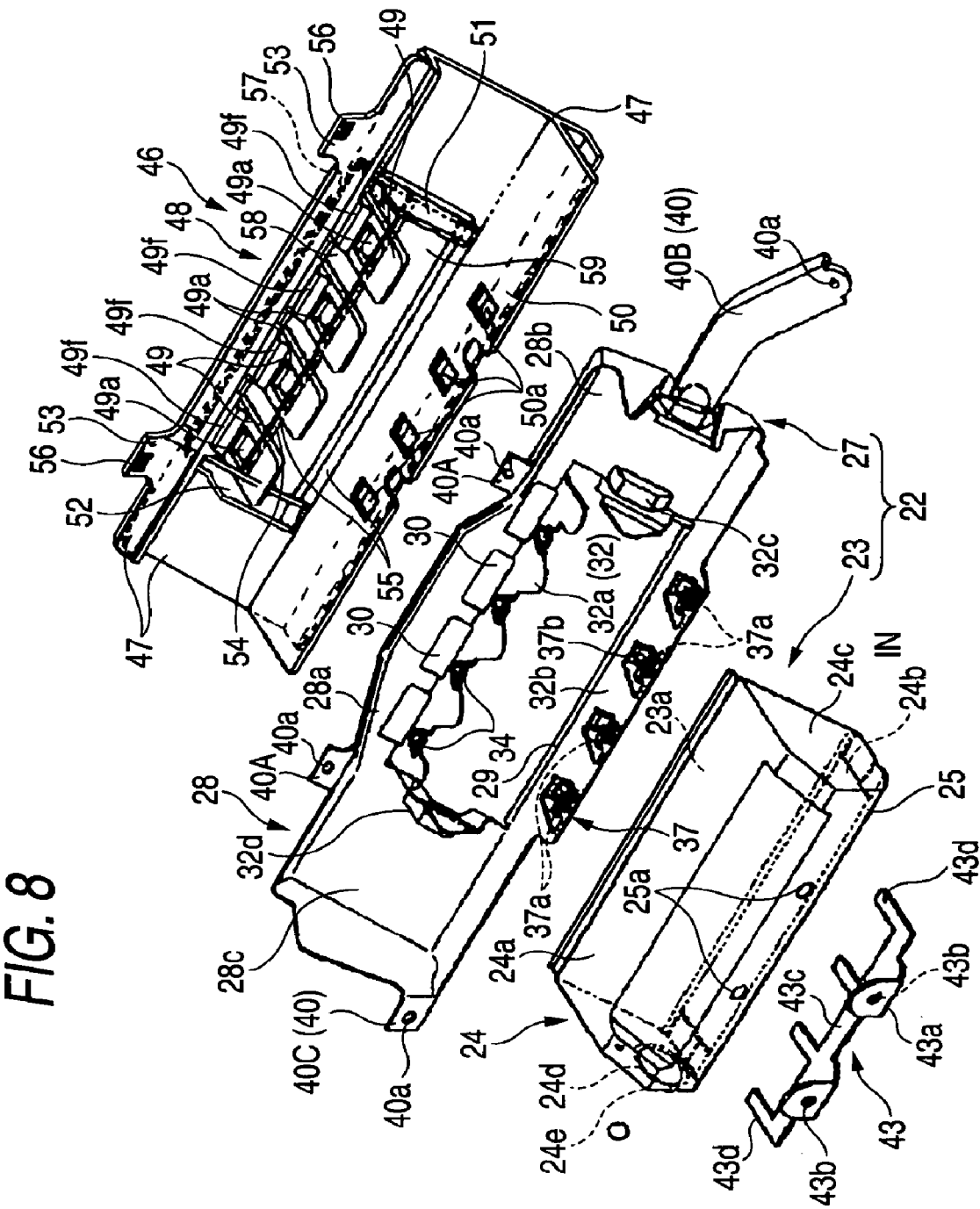
FIG. 8 is a vehicle back-and-forth direction enlarged schematic section view of an air bag cover and a case used in the knee protection air bag apparatus according to the second embodiment of the invention taken along the portion II-II shown in FIG. 1, showing how to assemble together such air bag cover, and case.
Figure 9:
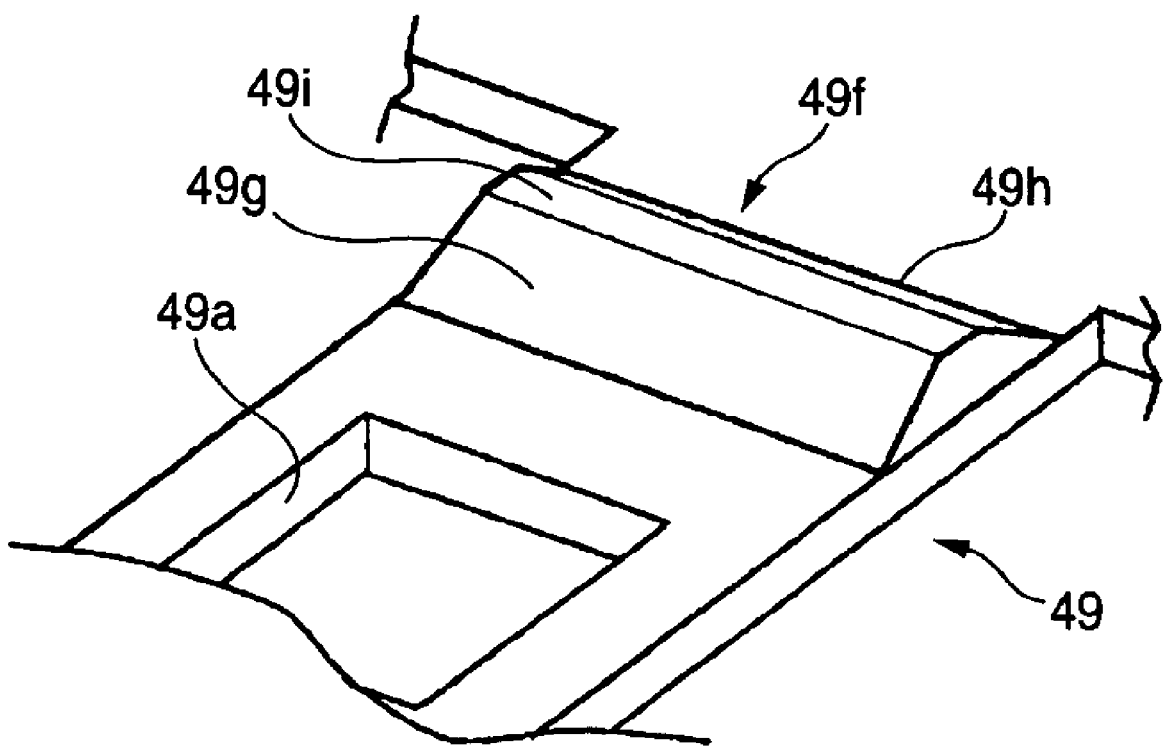
FIG. 9 is an enlarged side view of a stopper portion formed in the knee protection air bag apparatus according to the second embodiment of the invention.

The projecting streak 49f, as shown in FIGS. 7 and 9, is constituted by a first inclined portion 49g existing on the front side thereof, a vertical portion 49h existing on the rear side thereof, and an intermediate portion 49i which connects together the first inclined portion 49g and vertical portion 49h. As regards the first inclined portion 49g, with the vehicle front side thereof as the base end portion thereof with respect to the assembly piece 49, the first inclined portion 49g is inclined so as to part backwardly away from the assembly piece 49. As regards the vertical portion 49h, with the vehicle front side thereof as the base end portion thereof with respect to the assembly piece 49, the vertical portion 49h is inclined so as to part forwardly away from the assembly piece 49 (to thereby form a second inclined portion). The intermediate portion 49i, connects together the front end of the first inclined portion 49g and the rear end of the vertical portion 49*h* and, in the second embodiment, it is formed so as to be parallel to the assembly piece 49. That is, in the second embodiment, since the vertical direction height of the front end of the first inclined portion 49*g* from the assembly piece 49 is set equal to that of the rear end of the vertical portion 49*h*, the projecting streak 49*f* is formed so as to have a trapezoidal shape when it is viewed from the side surface thereof. However, when the vertical direction height of the front end of the first inclined portion 49*g* is different from that of the rear end of the vertical portion 49*h*, the intermediate portion 49*i* provides an inclined surface which connects them together. Also, when an installation space is small, the intermediate portion 49*i* can be omitted. However, in this case, the projecting streak 49*f* can also be formed in a triangular shape, or in a substantially angular shape the top portion of which is formed as a rounded shape.

In the second embodiment as well, the knee protection air bag apparatus S1 can be assembled similarly to the first embodiment. In the assembled state of the knee protection air bag apparatus S1, since the air bag cover 46 is assembled such that it is movable in the back-and-forth direction with respect to the case 22, preferably, in three directions, namely, in the back-and-forth direction, in the vertical direction and in the right and left direction, an assembling error can be absorbed and thus the air bag cover 46 is movable with respect to the lower panel 19*b* disposed upwardly of the air bag cover 46 such that no incongruous feeling can be produced between the lower panel 19*b* and itself.

Here, the air bag cover 46, when the air bag 73 develops and expands, is pressed by the air bag 73 and is moved in the vehicle backward direction with respect to the case 22. In this case, the vertical portion 49*h* of the projecting streak 49*f* is contacted with the main body portion 28 in the peripheral edge of the fit hole 30 from the vehicle forward side, whereby the air bag cover 46 can receive the pressure applied thereto from the developed and expanded air bag 73 and also can transmit the developing and expanding power of the air bag 73 to the lid portion 57 effectively. By the way, in the second embodiment, the pawl-shaped upper securing portion 34 of the case 22 is engaged with the engaging hole 49*a* of the assembly piece 49, whereby the air bag cover 46 is movable in the backward direction as well by a given amount (D4) (a second movable amount) with respect to the case 22. On the other hand, between the rear end of the vertical portion 49*h* of the projecting streak f and the vertical wall portion 28*a* in the peripheral edge of the fit hole 30 as well, there is formed a given clearance (D3). Thus, the air bag cover 46 is movable in the vehicle backward direction by this clearance D3 amount (a first movable amount) with respect to the case 22. However; since the clearance D3 is set smaller than the clearance D4, the developing and expanding power of the air bag 73 can be transmitted to the lid portion more effectively. (See FIG. 7).

Also, in the second embodiment as well, similarly to the first embodiment, there is a possibility that, at a position where the air bag cover 46 is moved backward by the clearance D3, the power of the air bag 73 cannot be received sufficiently due to the deformation of the assembly piece 49, due to the misalignment of the projecting streak 49*f* with the fit hole 30, or the like. However, in this case as well, the front end of the pawl-shaped upper securing portion 34 is contacted with the rear end of the inside diameter of the engaging hole 49*a* to thereby prevent the air bag cover 46 against further movement at the position where it has moved backward by the clearance D4, so that the developing and expanding power of the air bag 73 can be transmitted to the lid portion 57 effectively.

In the second embodiment, the vertical portion 49*h* is structured such that, with the vehicle front side thereof as the base end portion thereof with respect to the assembly piece 49, it is inclined so as to part forwardly away from the assembly piece 49. The air bag 73, when it is developed and expanded, presses against the lid portion 57 of the air bag cover 46, breaks the breaking portion 54 and develops into the vehicle room. However,the air bag 73 develops and expands not only in the backward direction but also in the vertical direction and in the right and left direction as well to thereby press against the upper and lower peripheral wall portions 24*a*, 24*b* and right and left peripheral wall portions 24*c*, 24*d* of the case 22 as well. Therefore, since the vertical portion 49*h* is structured such that, with the vehicle front side thereof as the base end portion thereof with respect to the assembly piece 49, it is inclined so as to part forwardly away from the assembly piece 49, in the relatively early stage of the development and expansion of the air bag 73, the vertical portion 49*h* can be contacted with the main body portion 28 in the peripheral edge of the fit hole 30 from the front side of the vehicle. This makes it possible to transmit the developing and expanding power of the air bag 73 to the lid portion 57 of the air bag cover 56 effectively without weakening it, whereby the breaking portion 54 can be broken and thus the lid portion 57 can be developed smoothly.

In the second embodiment as well, similarly to the first embodiment, before the air bag 73 is expanded and developed, there is formed an overlapping portion L1 between the right and left side wall portions 51, 52 with the front portions thereof disposed in the groove portions M, M and the right and left peripheral wall portions 24*c*, 24*d*; and, when the air bag 73 is expanded and developed, the air bag cover 46 is moved backward with respect to the case 22, the vertical portion 49*h* of the projecting streak 49*f* is contacted with the main body portion 28 in the peripheral edge of the fit hole 30 from the front side of the vehicle to thereby prevent the air bag cover 46 from moving further and, in this state as well, there is formed an overlapping portion L2. Therefore, the developing and expanding air bag 73 is guided by the right and left side wall portions 51, 52 and right and left peripheral wall portions 24*c*, 24*d*, whereby the air bag 73 can positively be developed and expanded toward the knees K of the occupant MD seated in the vehicle room (see FIG. 5).

As has been described above, in the second embodiment as well, there can be provided a similar effect to the first embodiment.

Third Embodiment

Next, description will be given below of a knee protection air bag apparatus S2 according to a third embodiment of the invention with reference to FIGS. 1 and 10. By the way, in the third embodiment, the same parts thereof as in the first embodiment are given the same designations and description will be given of the parts thereof that are different from those used in the first embodiment.

The kneel protect air bag apparatus S2 according to the third embodiment, as shown in FIG. 1, similarly to the first and second embodiments, is disposed downwardly of the steering column 13 existing on the vehicle forward side of the occupant MD in order to be able to protect the knees K (KL, KR) of the occupant MD.

Figure 10:
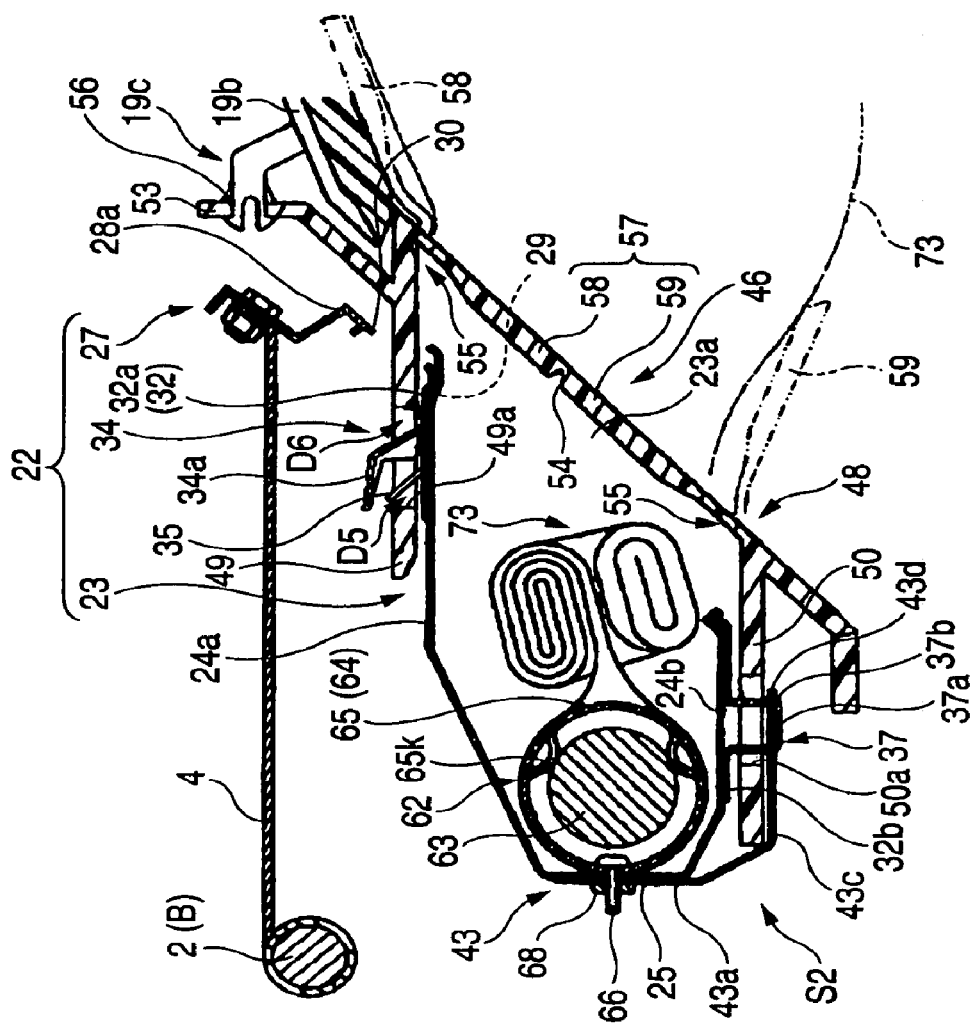
FIG. 10 is a vehicle back-and-forth direction schematic section view of a knee protection air bag apparatus according to a third embodiment of the invention taken along the portion I-I shown in FIG. 1, showing how to assemble such air bag apparatus.

In the third embodiment, as shown in FIG. 10, there is formed a stopper portion 35 on the upper surface of the upper fixing portion 32*a* existing on the rear side of the pawl-shaped upper securing portion 34.

The stopper portion 35, similarly to the storage part 23 and upper fixing portion 32a, is made of sheet metal, is fixed to the upper surface of the upper fixing portion 32a according to a method similar to the method for fixing the upper fixing portion 32a to the upper peripheral wall portion 24a of the storage part 23, and is formed in a plate shape which is inclined forwardly from its base end portion fixed to the upper fixing portion 32a. And, the stopper portion 35 is engaged with the engaging hole 49a together with the pawl-shaped securing portion 34. Further, between the front side surface of the stopper portion 35 and the rear end of the inside diameter of the engaging hole 49a, there is formed a given clearance (D5). That is, the backward movement of the air bag cover 46 with respect to the case 22 is regulated by the stopper portion 35, while the air bag cover 46 is movable backward only by an amount equivalent to the dimension of the clearance D5 (the first movable amount).

Similarly to the first and second embodiments, the air bag cover 46 is assembled to the case not only through the engagement between the pawl-shaped upper securing portion 34 and engaging hole 49a but also through the engagement between the lower securing portion 37, hold member 43 and securing hole portion 50a, and is movable in the back-and-forth direction, preferably, in three directions, namely, in the back-and-forth direction, in the vertical direction and in the right and left direction. That is, in a state where the pawl-shaped upper securing portion 34 is in engagement with the engaging hole 49a, between the rear end of the pawl-shaped upper securing portion 34 and the front end of the inside diameter of the engaging hole 49a, there is formed a clearance D6. In other words, the backward movement of the air bag cover 46 with respect to the case 22 is regulated by the engagement between the pawl-shaped upper securing portion 34 and engaging hole 49a, while the air bag cover 46 is movable backward only by an amount equivalent to the dimension of the clearance D6 (the second movable amount).

In the third embodiment, the second movable amount D6 is set larger than the first movable amount D5 and the air bag cover 46, when it is pressed by the expanding and developing power of the air bag 73, is moved backward with respect to the case 22 by an amount equivalent to the back-and-forth direction dimension of the clearance D5, that is, the first movable When the air bag, cover 46 is moved backward with respect to the case 22 by an amount equivalent to the back-and-forth direction dimension of the first movable amount D5 and the front side surface of the stopper portion 35 and the rear end of the inside diameter of the engaging hole 49a are contacted with each other, the further movement of the air bag cover 46 is prevented. In this state, because of the mutual contact between the front side surface of the stopper portion 35 and the rear end of the inside diameter of the engaging hole 49a, the expanding and developing power of the air bag 73 can be received positively by the air bag cover 46 and, therefore, the expanding and developing power of the air bag 73 applied to the lid portion 57 can be transmitted to the breaking portion 54 without being weakened. Further, in the third embodiment as well, similarly to the first and second embodiments, prior to expansion and development of the air bag 73, between the right and left peripheral wall portions 24c, 24d and the right and left side wall portions 51, 52 with the front portions thereof disposed in the groove portions M, M, there is formed an overlapping portion L1. And, also in a state where, owing to the expansion and development of the air bag 73, the air bag cover 46 is moved backward with respect to the case 22 and the front side surface of the stopper portion 35 and the rear end of the inside diameter of the engaging hole 49a are contacted with each other to thereby prevent the air bag cover 46 from moving further, there is formed an overlapping portion L2. Therefore, the developing and expanding air bag 73 is guided by the right and left side wall portions 51, 52 and right and left peripheral wall portions 24c, 24d, whereby the air bag 73 can be positively developed and expanded toward the knees K of the occupant MD seated in the vehicle room (see FIG. 5).

As has been described above, in the third embodiment as well, there can be provided a similar effect to the first and second embodiments.

Fourth Embodiment

Next, description will be given below of a kneel protect air bag apparatus S3 according to a fourth embodiment of the invention with reference to FIGS. 1, 11 and 12. In the fourth embodiment, the same parts thereof as in the first embodiment are given the same designations and description will be given below of the parts thereof that are different from those used in the first embodiment.

The kneel protect air bag apparatus S3 according to the fourth embodiment, as shown in FIG. 1, similarly to the first embodiment, is disposed downwardly of the steering column 13 existing on the vehicle front side of the occupant MD in order to be able to protect the knees K (KL, KR) of the occupant MD.

In the fourth embodiment, at the same position of the assembly piece 49 as in the first embodiment, that is, on the rear side of the engaging hole 49a there is provided projecting streak 49j which projects upwardly and functions as a stopper portion. The projecting streak 49j is structured as a large-thickness portion which projects from a portion of the assembly piece 49 and has the same width as the right-and-left direction width of the assembly piece 49. (See FIG. 11).

Figure 11:
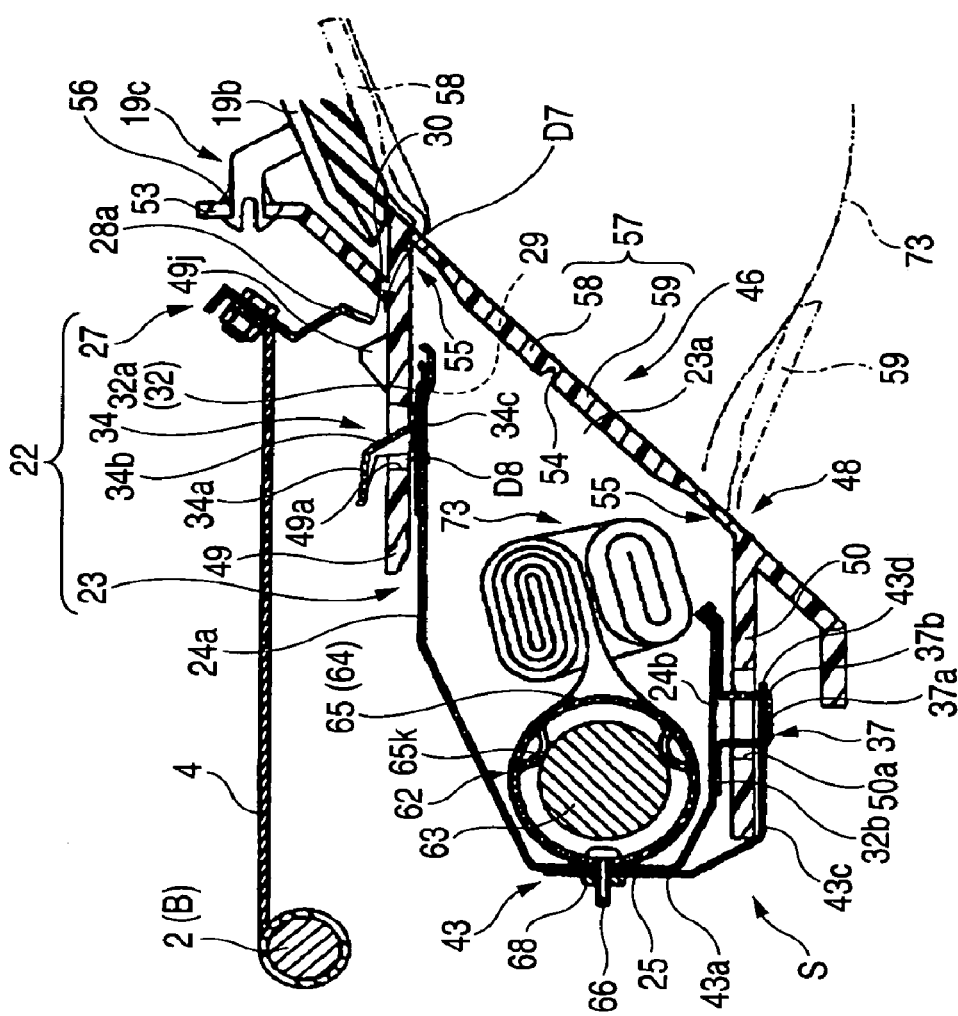
FIG. 11 is a vehicle back-and-forth direction schematic section view of a knee protection air bag apparatus according to the fourth embodiment of the invention taken along the portion I-I shown in FIG. 1, showing how to assemble such air bag apparatus.
Figure 12:
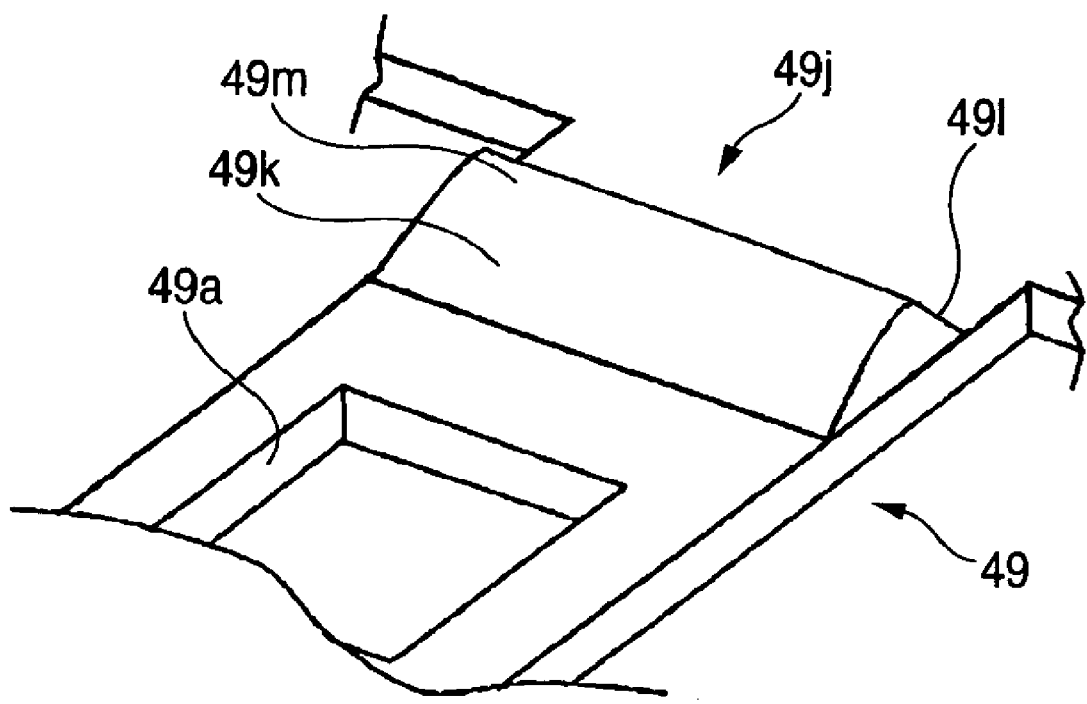
FIG. 12 is an enlarged side view of a stopper portion formed in the knee protection air bag apparatus according to the fourth embodiment of the invention.

The projecting streak 49j, as shown in FIGS. 11 and 12, is constituted by a first inclined portion 49k existing on the front side thereof, a second inclined portion 49l existing on the rear side thereof, and a peak portion 49m which connects together the first inclined portion 49k and second inclined portion 49l (or vertical wall portion). As regards the first inclined portion 49k, with the vehicle front side thereof as the base end portion thereof with respect to the assembly piece 49, the first inclined portion 49k is inclined so as to part backwardly away from the assembly piece 49. As regards the second inclined portion 49l, with the vehicle front side thereof as the base end portion thereof with respect to the assembly piece 49, the second inclined portion 49l is inclined so as to part forwardly away from the assembly piece 49. The peak portion 49m connects together the front end of the first inclined portion 49k and the rear end of the second inclined portion 49l by a rounded smoothly curved surface in the fourth embodiment. That is, in the fourth embodiment, the front end of the first inclined portion 49k is connected to the rear end of the second inclined portion 49l, so that the projecting streak 49j is formed so as to have a generally triangular shape when it is viewed from the side surface thereof.

In the fourth embodiment, the second inclined portion 49l is formed so as to have an inclination angle, uprising from the surface of the assembly piece 49, larger than an inclination angle of the first inclined portion 49k. The air bag cover 46 is pressed by the air bag 73 and is moved in the vehicle backward direction with respect to the case 22 when the air bag 73 develops and expands. At this time, the second inclined portion 49l of the projecting streak 49j is contacted with the main body portion 28 in the peripheral edge of the fit hole 30 from the vehicle forward side. By forming the contact angle as large as possible, the air bag cover 46 can receive the pressure applied thereto from the air bag 73 when it is developed and expanded, whereby the developing and expanding power of the air bag 73 can be transmitted to the lid portion 57 effectively.

Further, by forming the inclination angle of the first inclined portion 49k small, the inclined portion 49k of the assembly piece 49 is in contact with the upper end of the inside diameter of the fit hole 30 for guiding therealong, when the air bag cover 46 is assembled to the case 22. As a result insertion of the assembly piece 49 can be easily performed.

Incidentally, the peak portion 49m can be formed as a flat surface similarly to the intermediate portion 49i described in the second embodiment Also, when an installation space is small, the peak portion 49m can be omitted so that the first inclined portion 49k and the second inclined portion 49l are connected to each other with a linear boundary.

In the fourth embodiment as well, the knee protection air bag apparatus S3 can be assembled similarly to the first to third embodiments. In the assembled state of the knee protection air bag apparatus S3, since the air bag cover 46 is assembled such that it is movable in the back-and-forth direction with respect to the case 22, preferably, in three directions, namely, in the back-and-forth direction, in the vertical direction and in the right and left direction, an assembling error can be absorbed and thus the air bag cover 46 is movable with respect to the lower panel 19b disposed upwardly of the air bag cover 46 such that no incongruous feeling can be produced between the lower panel 19b and itself.

Here, the air bag cover 46, when the air bag 73 develops and expands, is pressed by the air bag 73 and is moved in the vehicle backward direction with respect to the case 22. In this case, as described above, the second inclined portion 49l of the projecting streak 49j is contacted with the main body portion 28 in the peripheral edge of the fit hole 30 from the vehicle forward side, whereby the air bag cover 46 can receive the pressure applied thereto from the developed and expanded air bag 73 and also can transmit the developing and expanding power of the air bag 73 to the lid portion 57 effectively. By the way, in the fourth embodiment, the pawl-shaped upper securing portion 34 of the case 22 is engaged with the engaging hole 49a of the assembly piece 49, whereby the air bag cover 46 is movable in the backward direction as well by a given amount (D8) (a second movable amount) with respect to the case 22. On the other hand, between the rear end of the second inclined portion 49l of the projecting streak 49j and the vertical wall portion 28a in the peripheral edge of the fit hole 30 as well, there is formed a given clearance (D7). Thus, the air bag cover 46 is movable in the vehicle backward direction by this clearance D7 amount (a first movable amount) with respect to the case 22. However, since the clearance D7 is set smaller than the clearance D8, the developing and expanding power of the air bag 73 can be transmitted to the lid portion more effectively. (See FIG. 11).

Also, in the fourth embodiment as well, similarly to the first embodiment, there is a possibility that, at a position where the air bag cover 46 is moved backward by the clearance D3, the power of the air bag 73 cannot be received sufficiently due to the deformation of the assembly piece 49, due to the misalignment of the projecting streak 49j with the fit hole 30, or the like. However, in this case as well, the front end of the pawl-shaped upper securing portion 34 is contacted with the rear end of the inside diameter of the engaging hole 49a to thereby prevent the air bag cover 46 against further movement at the position where it has moved backward by the clearance D8, so that the developing and expanding power of the air bag 73 can be transmitted to the lid portion 57 effectively.

In the fourth embodiment, the second inclined portion 49l is structured such that, with the vehicle front side thereof as the base end portion thereof with respect to the assembly piece 49, it is inclined so as to part forwardly away from the assembly piece 49. The air bag 73, when it is developed and expanded, presses against the lid portion 57 of the air bag cover 46, breaks the breaking portion 54 and develops into the vehicle room. However, the air bag 73 develops and expands not only in the backward direction but also in the vertical direction and in the right and left direction as well to thereby press against the upper and lower peripheral wall portions 24a, 24b and right and left peripheral wall portions 24c, 24d of the case 22 as well. Therefore, since the second inclined portion 49l is structured such that, with the vehicle front side thereof as the base end portion thereof with respect to the assembly piece 49, it is inclined so as to part forwardly away from the assembly piece 49, in the relatively early stage of the development and expansion of the air bag 73, the second inclined portion 49l can be contacted with the main body portion 28 in the peripheral edge of the fit hole 30 from the front, side of the vehicle; This makes it possible to transmit the developing and expanding power of the air bag 73 to the lid portion 57 of the air bag cover 56 effectively without weakening it, whereby the breaking portion 54 can be broken and thus the lid portion 57 can be developed smoothly.

In the fourth embodiment as well, similarly to the first to third embodiments, before the air bag 73 is expanded and developed, there is formed an overlapping portion L1 between the right and left side wall portions 51, 52 with the front portions thereof disposed in the groove portions M, M and the right and left peripheral wall portions 24c, 24d; and, when the air bag 73 is expanded and developed, the air bag cover 46 is moved backward with respect to the case 22, the second inclined portion 49l of the projecting streak 49j is contacted with the main body portion 28 in the peripheral edge of the fit hole 30 from the front side of the vehicle to thereby prevent the air bag cover 46 from moving further and, in this state as well, there is formed an overlapping portion L2. Therefore, the developing and expanding air bag 73 is guided by the right and left side wall portions 51, 52 and right and left peripheral wall portions 24c, 24d, whereby the air bag 73 can positively be developed and expanded toward the knees K of the occupant MD seated in the vehicle room (see FIG. 5).

As has been described above, in the fourth embodiment as well there can be provided a similar effect to the first to, third embodiments.

By the way, the above-mentioned embodiments can also be enforced in the other following embodiments.

(1) In each of the above-mentioned embodiments, the second movable amount is defined as the back-and-forth direction dimension of a clearance formed between the rear end portion of the inside diameter of the engaging hole and the rear end of the pawl-shaped upper securing portion. However, the second movable amount D2 may also be defined as a clearance formed between the rear end portion of the inside diameter of the securing hole portion and the rear end of the securing projection in a state where the lower securing portion, hold member and securing hole portion are secured. In this case, the dimension of the former clearance is set larger than the dimension of the latter clearance.

(2) In each of the above-mentioned embodiments, the first movable amount is set smaller than the second movable amount in the back-and-forth direction length thereof. However, the back-and-forth direction length of the first movable amount may also be set larger than the second movable amount.

(3) In the above-mentioned embodiments, the knee protection air bag apparatus is disposed below the steering column on the driver's seat side and adjacent to the instrument panel lower portion. However, the knee protection air bag apparatus may also be disposed on the passenger's seat. In this case, as the interior parts that adjoin the knee protection air bag apparatus, there can be pointed out the instrument panel main body, the lid of a glove box or the like.

(4) In the second embodiment, the stopper portion is formed on such portion of the upper surface of the upper fixing portion that exists on the rear side of the pawl-shaped upper securing portion. However, the stopper portion may also be formed in front of the securing projection of the lower securing portion, and it may be secured to the securing hole portion together with the securing projection.

(5) In the first embodiment, the shape of the stopper portion when it is viewed from above is defined as a substantially E-like shape with its front side opened. However, it may also be defined as a substantially U-like shape with its front side opened, or a comb teeth shape. Or, there may also be employed a block-shaped stopper portion having a section shape which is inclined from its rear side toward its front side and includes on its rear side a vertical portion substantially perpendicular to the upper surface of the assembly piece. Further, a small-thickness rib having the same section shape as the block-shaped stopper portion may also be erected on the upper surface of the assembly piece, provided that it can satisfy the necessary strength (preferably, two or more ribs may be provided) As regards the inclined portion, in the first embodiment; the shape thereof is defined as a substantially right triangle when it is viewed from the side surface thereof. However, it is also possible to employ other arbitrary shape such as a substantially arc-like shape, provide that it is inclined from its rear side toward its front side.

What is claimed is:

1. A knee protection air bag apparatus disposed in front of an occupant seated in a vehicle, comprising:
    a case fixed to a body of the vehicle for storing therein a folded air bag and an inflator for supplying expanding gas to the air bag, the case including an opening formed in a rear of the case and disposed below an instrument and in the vehicle;
    an air bag cover including a lid portion covering the opening of the case and openable when the air bag develops and expands, a general portion disposed in a periphery of the lid portion and adjoining interior parts of the vehicle when the knee protection air bag apparatus is mounted in the vehicle, and an assembling mechanism for assembling the air bag cover to the case such that the air bag cover is movable in a vehicle back-and-forth direction; and
    a stopper portion formed at least one of the air bag cover and the case,
    wherein the stopper regulates a movement of the air bag cover in a vehicle backward direction in a state where the air bag cover is assembled to the case by the assembling mechanism,
    wherein the air bag cover includes an assembly piece projected in a vehicle forward direction from the general portion and an engaging hole formed in the assembly piece which constitute the assembling mechanism;
    the case includes a peripheral wall portion capable of storing the folded air bag and the inflator so as to cover outer peripheries of the air bag and the inflator, and a vertical wall portion erected substantially in a vehicle vertical direction so as to extend outwardly from an opening end of the opening of the case;
    a fit hole into which the assembly piece can be fitted is formed in the vertical wall portion;
    a securing portion which can be secured to the engaging hole so as to be movable in the vehicle back-and-forth direction is formed in the peripheral wall portion;
    a projecting streak which can be inserted into the fit hole and functions as the stopper portion is formed on the assembly piece on a vehicle-backward side of the engaging hole; and,
    the stopper portion includes a vertical portion having a rear portion thereof contacted with a vehicle-forward side surface of the vertical wall portion in a peripheral edge of the fit hole to thereby regulate the vehicle-backward movement of, the air bag cover with respect to the case when the air bag cover moves in the vehicle backward direction with respect to the case.

2. A knee protection air bag apparatus according to claim 1, wherein the stopper portion is configured to limit the air bag cover to move by both a first movable amount and a second movable amount in the vehicle backward direction with respect to the case in a state where the air bag cover is assembled to the case by the assembling mechanism such that the air bag cover is movable in the vehicle back-and-forth direction, and
    the first movable amount is set smaller than the second movable amount by which the stopper portion is configured to limit the air bag cover to move in the vehicle backward direction with respect to the case when the air bag cover is assembled to the case by the assembling mechanism such that the air bag cover is movable in the back-and-forth direction with respect to the case.

3. A knee protection air bag apparatus according to claim 1, wherein the air bag cover includes the assembling mechanism for assembling the air bag cover to the case such that the air bag cover is movable in a vehicle vertical direction and in a vehicle right and left direction with respect to the case.

4. A knee protection air bag apparatus according to claim 1, wherein the projecting streak is formed as a large-thickness portion provided by projecting a portion of the assembly piece.

5. A knee protection air bag apparatus according to claim 1, wherein the projecting streak includes two or more ribs which are projected substantially perpendicularly from the assembly piece and arranged substantially parallel to each other in the back-and-forth direction.

6. A knee protection air bag apparatus according to claim 1, wherein the projecting streak includes a first inclined portion which is apart from a base end portion toward the vehicle backward direction with a vehicle-forward side portion as a base end portion to the assembly piece, and a vertical portion facing the peripheral wall portion on the rear side of the first inclined portion.

7. A knee protection air bag apparatus according to claim 6, wherein the vertical portion includes a second inclined portion which is inclined forwardly from the base end portion so as to be apart from the assembly piece toward with a vehicle-backward side portion existing backward of the first inclined portion as a base end portion.

8. A knee protection air bag apparatus according to claim 7, wherein an inclination angle of the second inclined portion is larger than an inclination angle of the first inclined portion.

9. A knee protection air bag apparatus according to claim 6, wherein the vertical portion is formed substantially perpendicularly to the assembly piece on the backward side of the inclined portion of the first inclined portion.

10. A knee protection air bag apparatus according to claim 1, wherein the assembly piece is constituted by two or more assembly pieces, and the stopper portion is provided one on each of the two or more assembly pieces.

11. A knee protection air bag apparatus according to claim 1, wherein a portion of the general portion existing on the vehicle upward side of the lid portion of the air bag cover includes a mounting portion for mounting the air bag cover onto the vehicle interior part adjoining the air bag cover, and the assembly piece is disposed downward of the mounting portion and upward of the upper end of the lid portion in the vehicle vertical direction.

12. A knee protection air bag apparatus according to claim 1, wherein the air bag cover includes a side wall portion projected in the vehicle forward direction from the peripheral edge of the lid portion; The air bag cover is assembled to the case by the assembling mechanism such that the side wall portion of the air bag cover and the peripheral wall portion of the case are substantially parallel to each other and that the two wall portions have overlapping portions where they are overlapped on each other in the vehicle back-and-forth direction; and, the vehicle back-and-forth direction length of the overlapping portion is set larger than the first movable amount.

* * * * *